US012549637B2

(12) United States Patent
Kim et al.

(10) Patent No.: US 12,549,637 B2
(45) Date of Patent: Feb. 10, 2026

(54) ELECTRONIC DEVICE ESTABLISHING DATA SESSION WITH NETWORK SLICE, AND METHOD FOR OPERATING SAME

(71) Applicant: SAMSUNG ELECTRONICS CO., LTD., Suwon-si (KR)

(72) Inventors: Taewan Kim, Suwon-si (KR); Jinhyoung Kim, Suwon-si (KR); Wonbo Lee, Suwon-si (KR); Jaewon Jang, Suwon-si (KR); Sungin Kim, Suwon-si (KR); Hongshik Kim, Suwon-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 72 days.

(21) Appl. No.: 18/242,245

(22) Filed: Sep. 5, 2023

(65) Prior Publication Data

US 2023/0412687 A1 Dec. 21, 2023

Related U.S. Application Data

(63) Continuation of application No. PCT/KR2022/002519, filed on Feb. 21, 2022.

(30) Foreign Application Priority Data

Mar. 5, 2021 (KR) ........................ 10-2021-0029421

(51) Int. Cl.
*H04L 67/141* (2022.01)

(52) U.S. Cl.
CPC .................................. *H04L 67/141* (2013.01)

(58) Field of Classification Search
CPC ...... H04L 67/141; H04W 12/06; H04W 76/12
See application file for complete search history.

(56) References Cited

U.S. PATENT DOCUMENTS 9,191,381 B1* 11/2015 Popp .................... H04L 63/0823
9,560,038 B2* 1/2017 Gupta ................... H04L 63/102
(Continued)

FOREIGN PATENT DOCUMENTS

CN 111314474 A 6/2020
CN 111314475 A 6/2020
(Continued)

OTHER PUBLICATIONS

3GPP; TSG CT; User Equipment (UE) policies for 5G System (5GS); Stage 3 (Release 17).
(Continued)

*Primary Examiner* — Madhu Woolcock
(74) *Attorney, Agent, or Firm* — CANTOR COLBURN LLP

(57) ABSTRACT

An electronic device includes a memory and a processor configured to: store, in the memory, relationship information comprising identification information of at least one application, verification information for verification of each of the at least one application, and information for establishing a protocol data unit (PDU) session for each of the at least one application; confirm a first value on the basis of a first application having first identification information included in the relationship information; confirm, by using the relationship information, a second value on the basis of verification information corresponding to the first identification information; establish, on the basis of the first value and the second value being the same, a first PDU session by using the information for establishing the PDU session corresponding to the first application; and transmit or receive data related to the first application by using the first PDU session.

20 Claims, 22 Drawing Sheets

(56) References Cited

U.S. PATENT DOCUMENTS

| | | | |
|---|---|---|---|
| 10,708,836 | B1 | 7/2020 | Buyukdura et al. |
| 2003/0056094 | A1* | 3/2003 | Huitema ................ H04L 63/04 713/157 |
| 2006/0075224 | A1* | 4/2006 | Tao ...................... G06F 21/121 713/164 |
| 2008/0046715 | A1* | 2/2008 | Balazs ................ H04L 63/0815 713/152 |
| 2015/0089632 | A1* | 3/2015 | Bartholomew ....... G06F 21/629 726/17 |
| 2015/0109908 | A1* | 4/2015 | Andrada ........... H04W 52/0264 455/411 |
| 2015/0304307 | A1* | 10/2015 | Kaur ..................... H04W 12/06 726/8 |
| 2017/0038989 | A1* | 2/2017 | Seo .................... G06F 21/6218 |
| 2017/0257361 | A1* | 9/2017 | Niemelä ............... H04L 9/3247 |
| 2018/0192390 | A1 | 7/2018 | Li et al. |
| 2018/0302226 | A1* | 10/2018 | Heimlicher .......... H04L 63/061 |
| 2018/0316690 | A1 | 11/2018 | Cho et al. |
| 2018/0359795 | A1 | 12/2018 | Baek et al. |
| 2019/0014470 | A1 | 1/2019 | Bischinger |
| 2019/0313236 | A1 | 10/2019 | Lee et al. |
| 2020/0028842 | A1* | 1/2020 | Leiserson ............. H04L 9/3268 |
| 2020/0260525 | A1* | 8/2020 | Gan ...................... H04W 76/11 |
| 2020/0358744 | A1* | 11/2020 | Lee ...................... H04L 63/0263 |
| 2020/0382605 | A1 | 12/2020 | Ouyang et al. |
| 2020/0389531 | A1* | 12/2020 | Lee ......................... H04L 67/52 |
| 2021/0036890 | A1* | 2/2021 | Mishra ................ H04L 12/4633 |
| 2021/0044976 | A1* | 2/2021 | Avetisov ............. H04W 12/08 |
| 2021/0105623 | A1 | 4/2021 | Kweon et al. |
| 2021/0211879 | A1* | 7/2021 | Zisimopoulos ....... H04W 60/00 |
| 2021/0352575 | A1 | 11/2021 | Chun |
| 2021/0385189 | A1* | 12/2021 | Saghir .................. H04L 63/205 |
| 2022/0166776 | A1 | 5/2022 | Lee et al. |
| 2022/0264540 | A1* | 8/2022 | Panchal ................ H04W 72/04 |
| 2023/0023639 | A1* | 1/2023 | Shi ........................ H04W 76/12 |
| 2023/0049987 | A1* | 2/2023 | Qiu ...................... H04W 12/069 |
| 2023/0099322 | A1* | 3/2023 | Fu ....................... H04L 63/0823 713/156 |
| 2024/0056313 | A1* | 2/2024 | Salkintzis ............... H04L 63/20 |
| 2024/0137764 | A1* | 4/2024 | Guo .................... H04W 12/106 |

FOREIGN PATENT DOCUMENTS

| | | |
|---|---|---|
| EP | 4109839 A1 | 12/2022 |
| EP | 4109840 A1 | 12/2022 |
| KR | 20180021630 A | 3/2018 |
| KR | 20180099820 A | 9/2018 |
| KR | 20180134685 A | 12/2018 |
| KR | 20190005044 A | 1/2019 |
| KR | 20190118072 A | 10/2019 |
| KR | 20200118204 A | 10/2020 |
| WO | 2016208950 A1 | 12/2016 |
| WO | 2020080913 A1 | 4/2020 |
| WO | 2020204269 A1 | 10/2020 |

OTHER PUBLICATIONS

International Search Report and Written Opinion for International Application No. PCT/KR2022/002519; International Filing Date Feb. 21, 2022; Date of Mailing May 26, 2022; 8 Pages.

3GPP; TSG SA; Policy and charging control framework for the 5G System (5GS); Stage 2 (Release 16).

Extended European Search Report Issued In EP Application No. 22763517.4-1218, Mail Date Jul. 9, 2024, 11 Pages.

Indian Office Action Issued In IN Application No. 202347064979, Mail Date Sep. 10, 2025, 7 Pages.

* cited by examiner

ELECTRONIC DEVICE ESTABLISHING DATA SESSION WITH NETWORK SLICE, AND METHOD FOR OPERATING SAME

CROSS-REFERENCE TO RELATED APPLICATION(S

This application is a continuation application, claiming priority under § 365(c), of International Application No. PCT/KR2022/002519, filed on Feb. 21, 2022, which is based on and claims the benefit of Korean patent application number 10-2021-0029421 filed on Mar. 5, 2021, in the Korean Intellectual Property Office, the disclosures of which are incorporated by reference herein in their entireties.

BACKGROUND

Various embodiments relate to an electronic device for establishing a data session with a network slice and a method for operating the same.

In order to meet the demand for wireless data traffic soring since the 4G communication system came to the market, there are ongoing efforts to develop enhanced 5G communication systems or pre-50 communication systems. For the reasons, the 5G communication system or pre-5G communication system is called the beyond 4G network communication system or post LTE system. For higher data transmit rates, 50 communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

A prominent feature of 5G networks lies in adopting network slicing for radio access networks (RANs) and core networks (CNs). This is intended for bundling up network resources and network functions into a single independent network slice depending on individual services, allowing for application of network system function and resource isolation, customization, independent management and orchestration to mobile communication network architectures. The use of such network slicing enables offering 5G services in an independent and flexible way by selecting and combining 5G system network functions according to services, users, business models, or such references.

The 3rd generation partnership project (3GPP) defines user equipment (UE) route selection policy (URSP) rules. A UE may receive a URSP rule from a policy control function (PCF) and form a data session with a network slice. The URSP rule may include a traffic descriptor and a route selection descriptor. The traffic descriptor may include an application descriptor. According to the 3GPP, the application descriptor may include an OSId and an OSAppId. The UE may establish a data session (e.g., a PDU session) using a corresponding route selection descriptor in response to a network connection request of the application identified by the OSAppId.

The 3GPP standard does not limit the coding of the value field of the OSAppId. In general, the OSAppId is used as an application package name. A network operator and a UE manufacturer (or application developer) may negotiate so that an application having a specific package name uses a specific network slice. However, if a counterfeit application is created to have a specific package name, there is a possibility that use of the specific network slice of the counterfeit application is allowed.

SUMMARY

An electronic device and a method for operating the same according to various embodiments may determine whether to establish a data session according to a request of an application based on a URSP rule including information for verification.

According to various embodiments, an electronic device includes a memory and at least one processor. The at least one processor may be configured to store, in the memory, association information including identification information of at least one application, verification information for verifying each of the at least one application, and information for establishing a protocol data unit (PDU) session corresponding to the at least one application, identify a first value based on a first application having first identification information included in the association information, identify a second value based on verification information corresponding to the first identification information using the association information, establish a first PDU session using information for establishing the PDU session corresponding to the first application, based on the first value being identical to the second value, and transmit or receive data associated with the first application using the first PDU session.

According to various embodiments, a method for operating an electronic device includes storing, in a memory of the electronic device, association information including identification information of at least one application, verification information for verifying each of the at least one application, and information for establishing a protocol data unit (PDU) session corresponding to the at least one application, identifying a first value based on a first application having first identification information included in the association information, identifying a second value based on verification information corresponding to the first identification information using the association information, establishing a first PDU session using information for establishing the PDU session corresponding to the first application, based on the first value being identical to the second value, and transmitting or receiving data associated with the first application using the first PDU session.

According to various embodiments, an electronic device includes a memory and at least one processor. The at least one processor may be configured to store, in the memory, association information including identification information of at least one application, verification information for verifying each of the at least one application, and information for establishing a protocol data unit (PDU) session corresponding to the at least one application, request a server to verify a token included in the verification information based on a verification type of the verification information included in the association information being a server verification method, receive a refresh token from the server, corresponding to the request, establish a PDU session using information for establishing a first PDU session corresponding to identification information of a first application in response to a network connection request from the first application corresponding to the server verification method based on the reception of the refresh token, and transmit or receive data associated with the first application using the first PDU session.

According to various embodiments, there may be provided an electronic device capable of determining whether to establish a data session according to a request of an application based on a URSP rule including information for verification and a method for operating the same. Accordingly, use of a corresponding network slice may be prevented even when a counterfeit application stealing a package name requests a network connection.

DETAILED DESCRIPTION

Figure 1:
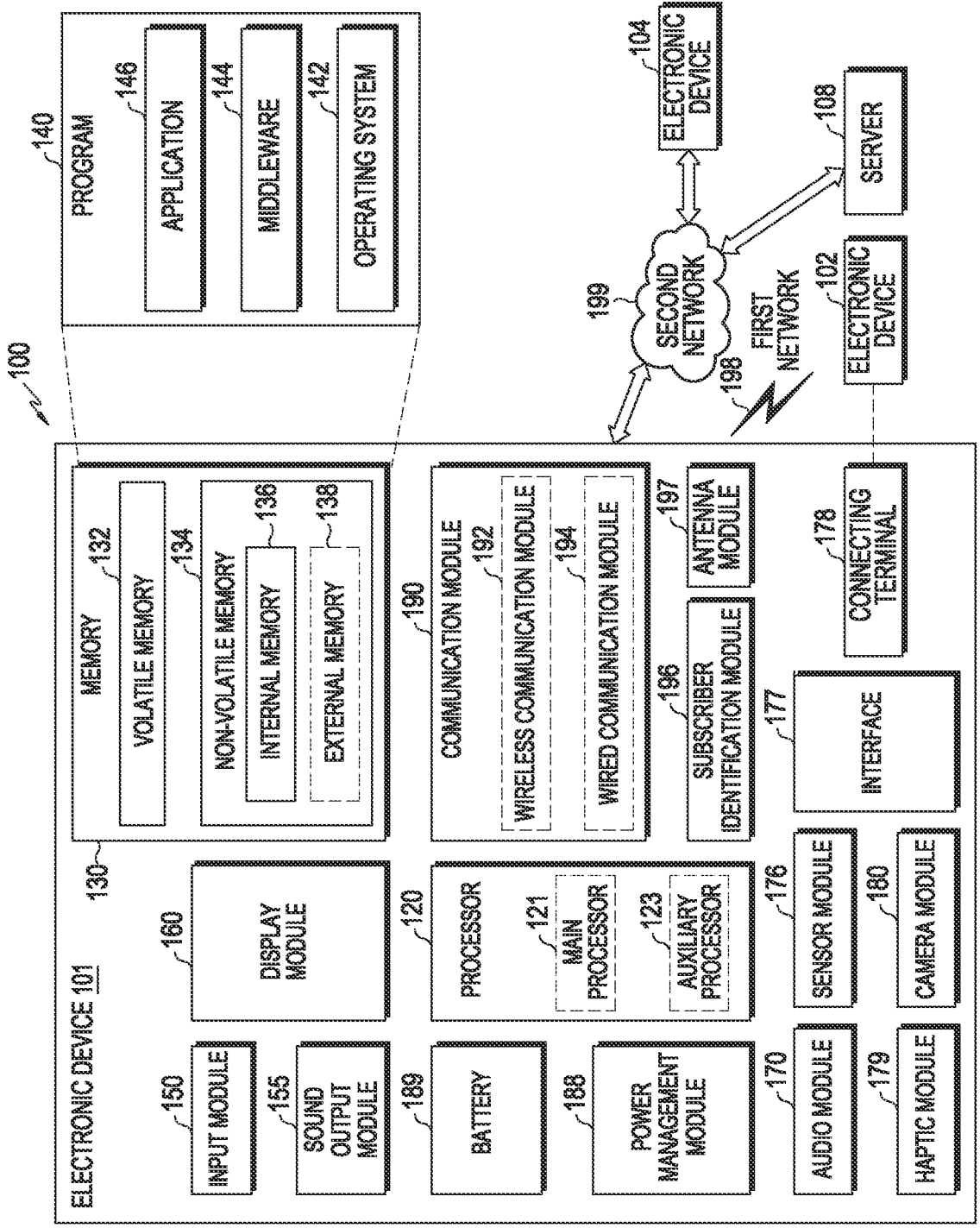
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the electronic device 101 may include a display module 160, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic device 102, the external electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
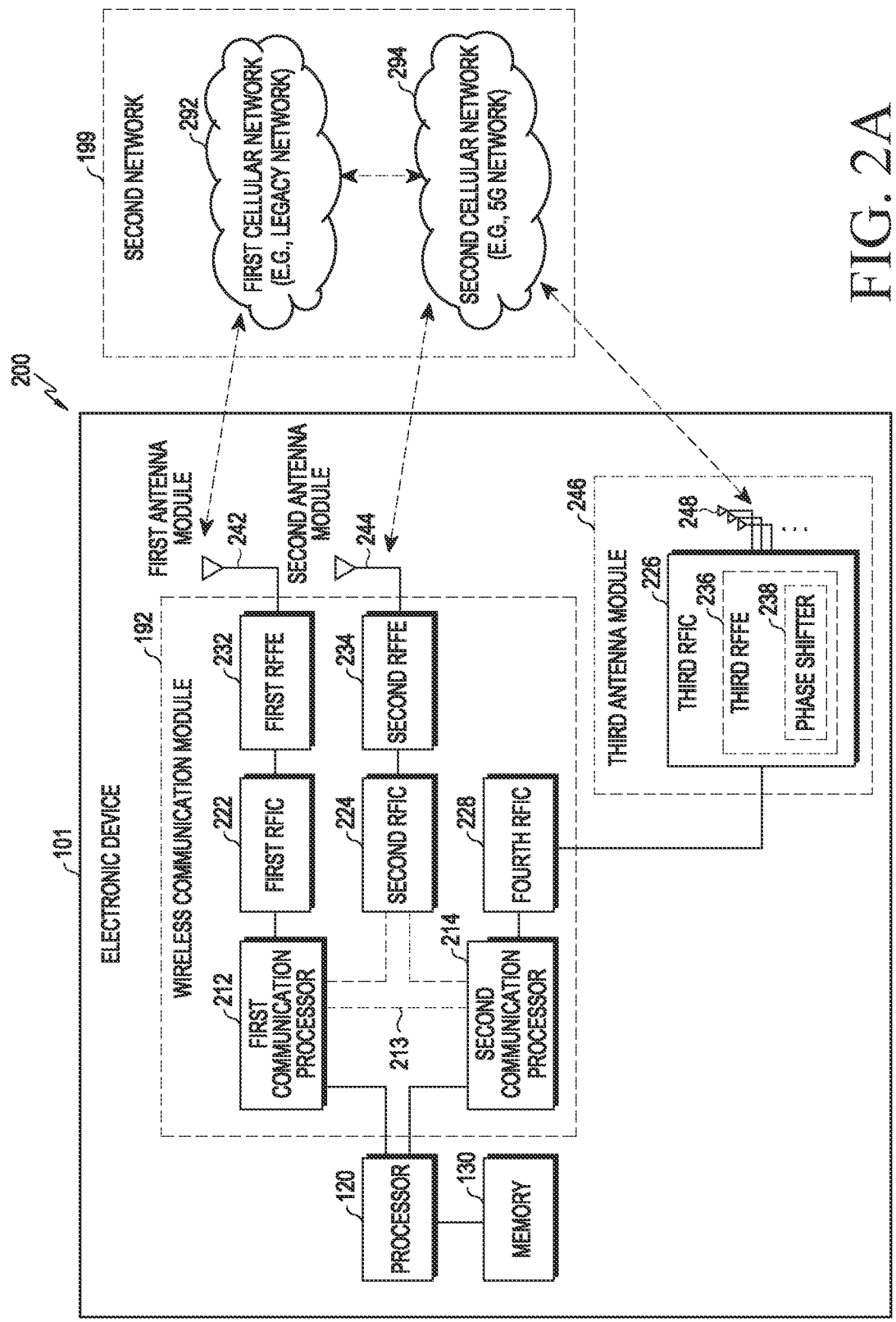
FIG. 2A is a block diagram illustrating an electronic device for supporting legacy network communication and 5G network communication according to various embodiments.

FIG. 2A is a block diagram 200 illustrating an electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network 292 may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various types of information, such as sensing information, information about output strength, and resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
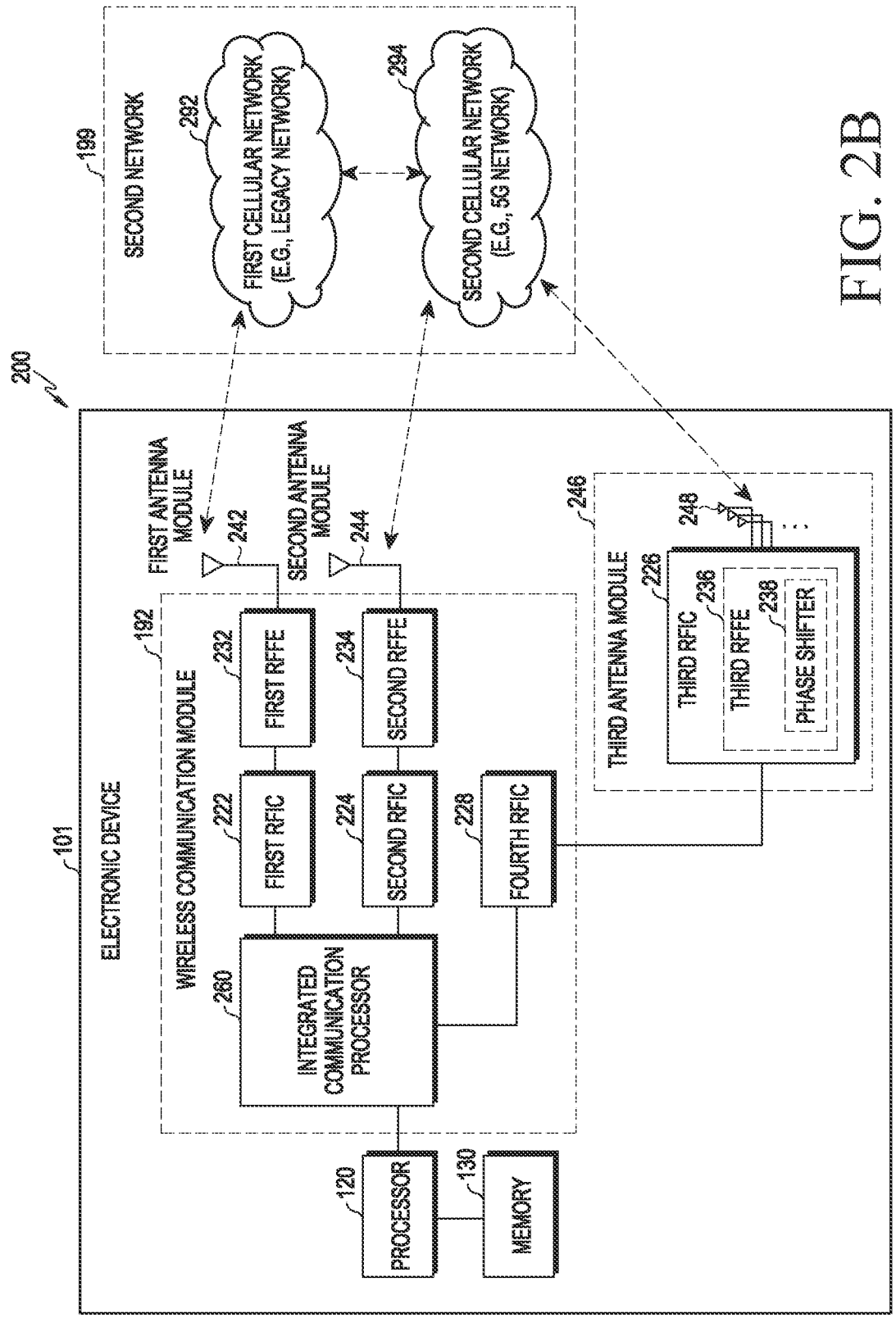
FIG. 2B is a block diagram illustrating an electronic device for supporting legacy network communication and 50 network communication according to various embodiments.

According to an embodiment, the first communication processor 212 and the second communication processor 214 may be implemented in a single chip or a single package. According to an embodiment, the first CP 212 or the second CP 214, along with the processor 120, an auxiliary processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above 6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above 6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 50 network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 50 network) may be operated independently (e.g., as standalone (SA)) from, or in connection (e.g., as non-standalone (NSA)) with the first cellular network 292 (e.g., a legacy network). For example, the 5G network may have the access network (e.g., 50 radio access network (RAN) or next generation RAN (NG RAN)) but may not have the core network (e.g., next generation core (NGC)). In this case, the electronic device 101, after accessing a 50 network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 212, or the second communication processor 214).

As used herein, terms for identifying access nodes, terms denoting network entities, terms denoting messages, terms denoting inter-network entity interfaces, and terms denoting various pieces of identification information are provided as an example for ease of description. For ease of description, various embodiments of the disclosure adopts terms and names defined in 5G system standards. However, the disclosure is not limited by such terms and names and may be likewise applicable to systems conforming to other standards. The description of embodiments of the disclosure focuses primarily on 3GPP communication standards, but the subject matter of the disclosure may also be applicable to other communication systems with a similar technical background with minor changes without significantly departing from the scope of the present invention, and this may be so performed by the determination of those skilled in the art to which the present invention pertains.

General communication systems have been designed independently from applications provided on the communication systems. The user accesses the communication system and then selects an application which the user intends to use and receives service. With the development of network function virtualization (NFV), software defined network (SDN), or such techniques, communication technology evolves to be able to configure a network slice optimized for the nature of each application over a single huge network.

One network slice is configured of an end-to-end (E2E) logical network including an electronic device 101 and an opposite node (an opposite electronic device or an opposite application server).

The user may access a network specified for the application which the user is using and receive a service. For example, the user's UE may simultaneously access one or more network slices.

The 3GPP which is in charge of mobile communication standardization has completed the 5G phase I standard which encompasses network slicing functions. Rel-16 goes on with the network slicing phase II standard.

Figure 3A:
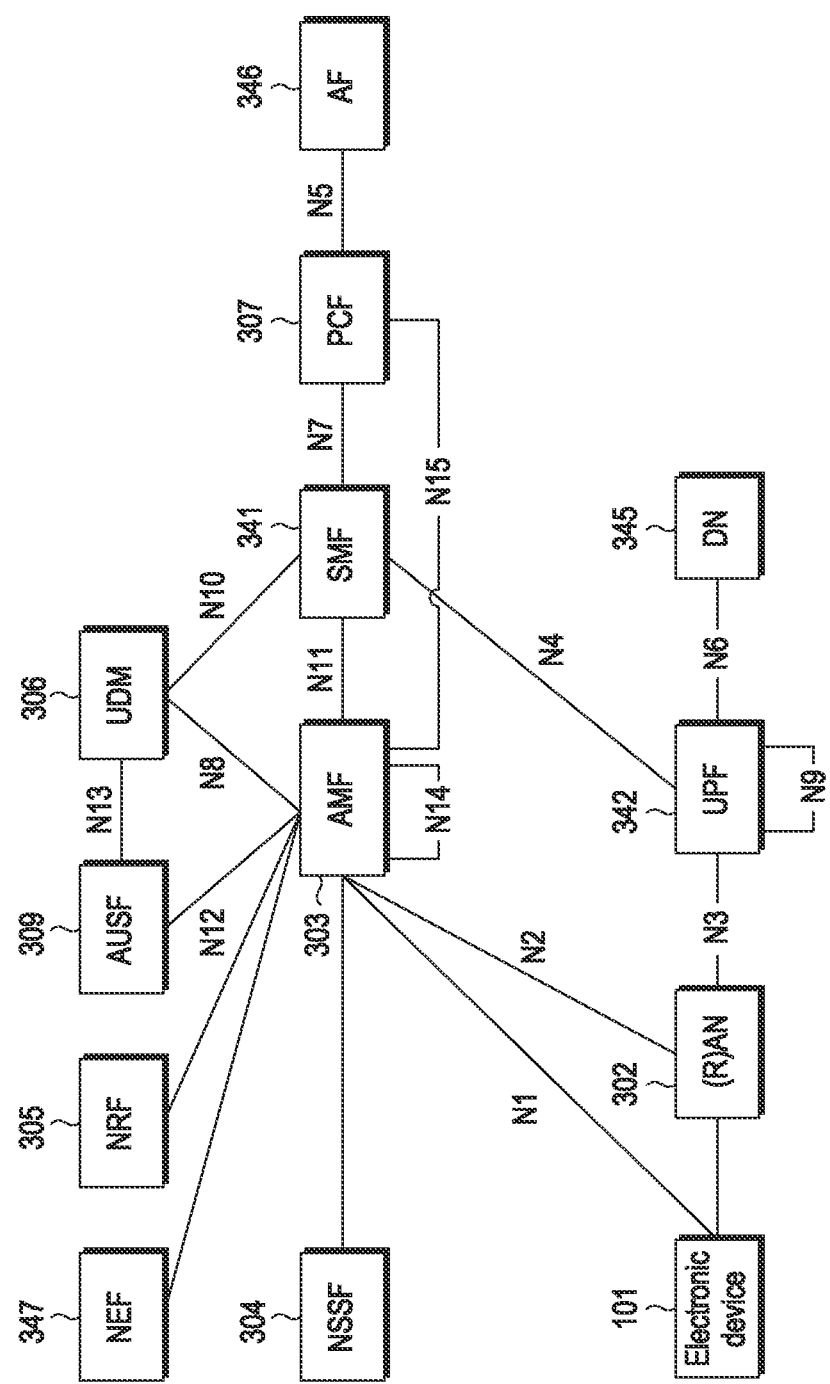
FIG. 3A illustrates a 50 system structure.
Figure 3B:
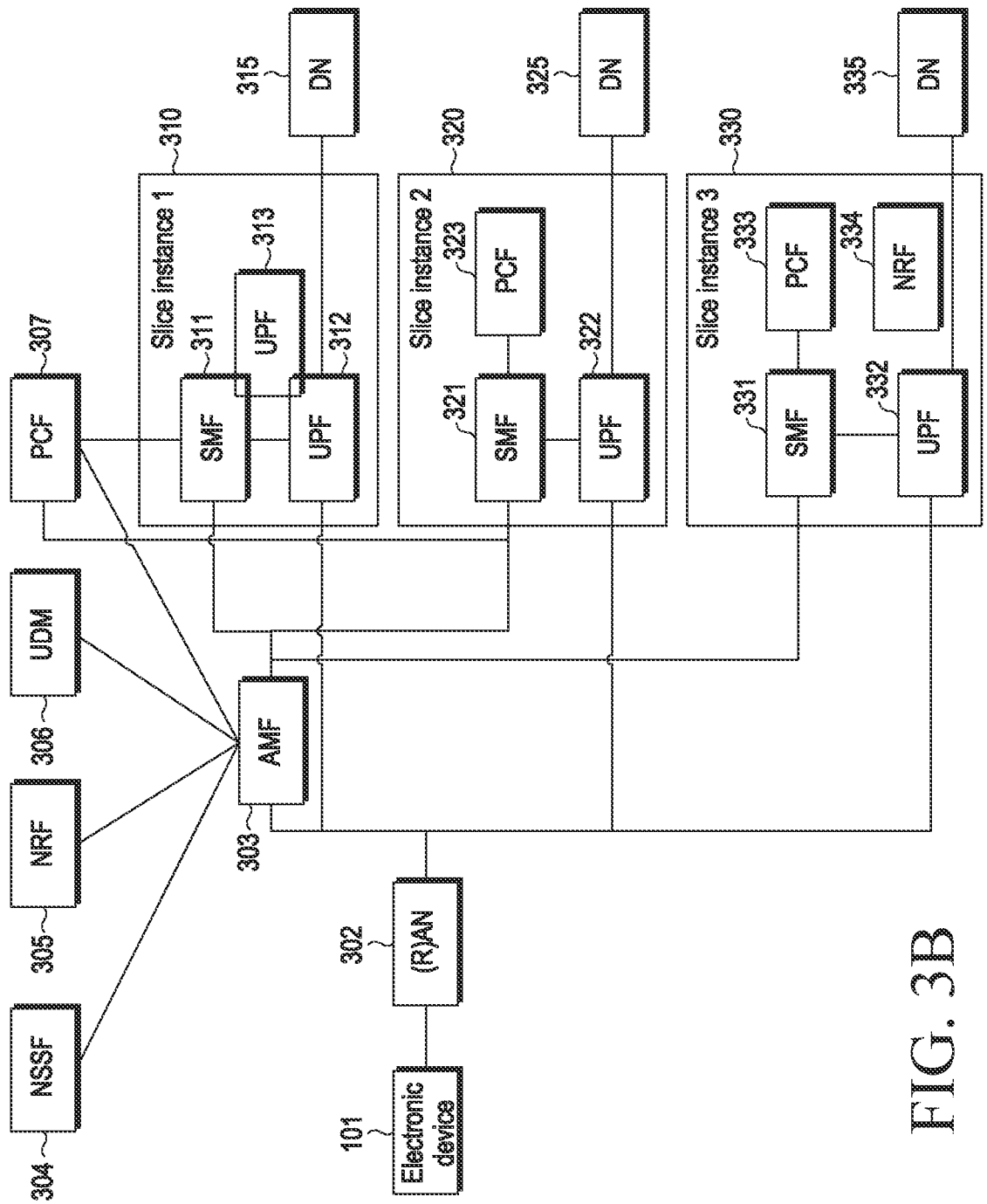
FIG. 3B illustrates a 5G network slice structure.

FIG. 3A illustrates a 5G system structure and FIG. 3B illustrates a 50 network slice structure. Hereinafter, the overall 5G system is described and then network slices are described with reference to FIGS. 3A and 3B.

Referring to FIG. 3A, a 5G system structure may include, as network elements, an electronic device 101 (e.g., a user equipment (UE)), a radio access network ((R)AN) 302, a data network (DN) 345, and a plurality of network functions (NFs) inside a core network (CN).

In the 5G system architecture, functions, connection points, or protocols may be defined for the plurality of NFs. The 5G system structure may be shown with reference points indicating service-based interfaces corresponding to the NFs and reference points indicating interactions present among the NFs.

The plurality of network functions (NFs) may include an authentication server function (AUSF) 309, an access and mobility management function (AMF) 303, a network exposure function (NEF) 347, a network function repository function (NRF) 305, a policy control function (PCF) 307, a session management function (SMF) 341, a unified data management (UDM) 306, a user plane function (UPF) 342, an application function (AF) 346, and a network slice selection function (NSSF) 304.

According to various embodiments of the disclosure, the AMF, SMF, PCF, and UPF may play a key role in establishing a UE-requested protocol data unit (PDU) session and managing traffic between the UE and the DN.

The reference point between the electronic device 101 and the AMF 303 is defined as N1.

The (R)AN 302 may represent a base station that uses radio access technology (RAT). For example, the AN 302 may be a base station with 3GPP access technology or a base station with non-3GPP access technology, such as Wi-Fi. The reference point between the AN 302 and the AMF 303 is defined as N2, and the reference point between the AN and the UPF 342 is defined as N3.

The DN 345 may deliver PDUs, which are to be sent on a downlink, to the UPF 342 or receive PDUs from the electronic device 101 via the UPF 342. The reference point between the DN 345 and the UPF 342 is defined as N6.

The AMF 303 may provide access and mobility management functionality independently of access technology, e.g., per electronic device 101. The reference point between the AMF 303 and the electronic device 101 is defined as N1. The reference point between the AMF 303 and the (R)AN 302 is defined as N2. The reference point between the AMF 303 and the UDM 306 is defined as N8. The reference point between the AMF 303 and the AUSF 309 is defined as N12. The reference point between the AMF 303 and the SMF 341 is defined as N11.

The SMF 341 may provide session management functionality in which, where one electronic device 101 has several sessions, a different SMF is assigned per session to manage the sessions. The UPF 342 is set up using control signal information produced by the SMF 341. The N4 reference point is defined for the UPF 342 to be able to report its state to the SMF 341. The reference point between the SMF 341 and the AMF 303 is defined as N11, the reference point between the SMF 341 and the UDM 306 is defined as N10, the reference point between the SMF 341 and the PCF 305 is defined as N7, and the reference point between the SMF 341 and the AMF 303 is defined as N11.

For example, each electronic device 101 may connect to one AMF 303. For the SMF 341, one electronic device 101 may establish several sessions, and thus, a different SMF 311, 321, or 331 may be provided for each session.

To ensure quality of service (QoS), the AF 346 may provide information about packet flow to the PCF 307 which is in charge of policy control.

The PCF 307 may determine policy, e.g., session management or mobility management, based on the packet flow-related information for ensuring QoS and transfer it to the AMF 303 or SMF 341, thereby enabling proper mobility management, session management, or QoS management. The reference point between the AF 346 and the PCF 307 is defined as N5.

The AUSF 309 may store data for authenticating the electronic device 101.

The UDM 306 may store the user's subscription data and policy data. The reference point between the AUSF 309 and the UDM 306 is defined as N13, the reference point between the AUSF 309 and the AMF 303 is defined as N12, the reference point between the UDM 306 and the AMF 303 is defined as N8, and the reference point between the UDM 306 and the SMF 341 is defined as N10.

The CP functions may include various functions to control the network and UE. As two representative functions, the electronic device 101, the (R)AN 302, the UPF 342, the AMF 303, the AF 346, and the DN 345 in charge of mobility management functionality and the SMF 341 in charge of session management functionality are two independent functions and they may be included in the CP functions.

In describing embodiments of the disclosure, the terms "slice," "service," "network slice," "network service," "application slice," and "application service" may interchangeably be used.

The mobile communication service carrier may assign network resources suited for the corresponding service per slice or per set of a particular slice. The network resources may mean network functions (NFs) or logical resources or radio resource allocations provided by the network functions (NFs).

Network slicing technology allows for application of such properties as network isolation, customization, and independent management and orchestration of mobile communication core network architecture by bundling network resources and network functions into a single independent slice depending on the service.

Network slicing is a new concept for 5G core networks. Network slicing technology bundles network resources and network functions necessary for the service requested by the UE into a single independent slice.

By network slicing, the network service provider may make independent allocations of network resources specified for each service and user and secure the flexibility of network by software defined network (SDN) and network function virtualization (NFV)-based resource virtualization and hence expandability and reliability of service and network resource operation.

The public land mobile network (PLMN) may provide several network slices, and each network slice may be provided to the UE in the form of a slice instance. For example, the PLMN may include slice instance 1 310, slice instance 2 320, and slice instance 3 330.

The electronic device 101 may access the network to receive a service from at least one of the several slice instances simultaneously or sequentially.

Each slice instance may include network resources necessary to provide the corresponding network slice. For example, slice instance 1 310 may include an SMF 311 and UPFs 312 and 313, slice instance 2 320 may include an SMF 321, a UPF 322, and a PCF 323, and slice instance 3 330 may include an SMF 331, a UPF 332, a PCF 333, and an NRF 334.

Referring to FIGS. 3A and 3B, the SMF 321 of slice instance 2 320 may be connected to a PCF 307 of PLMN level and the PCF 323 of slice level. The PCF 307 of PLMN level may manage policy information about the PLMN level and provide it to the SMF 321. The PCF 323 of slice level which belongs to slice instance 2 may manage the policy required to provide the corresponding slice and provide the corresponding information to the SMF 321.

Each slice may be identified with a slice identity (ID). As an example, the slice ID may be single-network slice selection assistance information (S-NSSAI) defined by the 3GPP. According to various embodiments, the electronic device 101 may store configured network slice selection assistance information (NSSAI) and network slice selection policy (NSSP)-related information. The configured NSSAI may be configured of an S-NSSAI list for network slices of subscription to the home PLMN (HPLMN) by the electronic device 101. The S-NSSAI list may include at least one S-NSSAI #id. For example, the S-NSSAI list may include S-NSSAI #a, S-NSSAI #b, S-NSSAI #c, and S-NSSAI #d. Since the configured NSSAI is determined based on the electronic device 101's subscription information, the S-NSSAI constituting the configured NSSAI may differ per electronic device 101. Further, since the configured NSSAI is determined based on the subscription information for the electronic device 101, if the subscription information for the electronic device 101 is changed, the configured NSSAI stored in the electronic device 101 may also be changed. The S-NSSAI list subscribed to by the electronic device 101 constituting the configured NSSAI may be stored in the integrated UDM 306 storing subscription information for the electronic device 101. The S-NSSAI subscribed to by the electronic device 101 stored in the UDM 306 may be referred to as 'subscribed S-NSSAI'. The NSSP represents mapping information between the electronic device 101-subscribed S-NSSAI (S-NSSAI #id) and the application which the corresponding S-NSSAI may support. One S-NSSAI #id may be mapped to at least one application. For example, S-NSSAI #a may be mapped to App #1 and App #2, S-NSSAI #b to App #1, S-NSSAI #c to App #3, and S-NSSAI # to all applications supportable. The NSSP may be stored in the policy control function (PCF) storing the electronic device 101 and network-related policy information. Or, the NSSP may be stored in the user data repository (UDR), and the PCF may, as necessary, send a request for NSSP information to the UDR and obtain the NSSP information from the UDR. When the subscription information for the electronic device 101 varies, a variation may be made to the electronic device 101 subscribed S-NSSAI information stored in the UDM 306. When the subscription information for the electronic device 101 varies, the NSSP information stored in the PCF or UDR may be varied. If at least one of subscribed S-NSSAI or NSSP varies, the relevant configuration information stored in the electronic device 101 needs to be updated.

Figure 4:
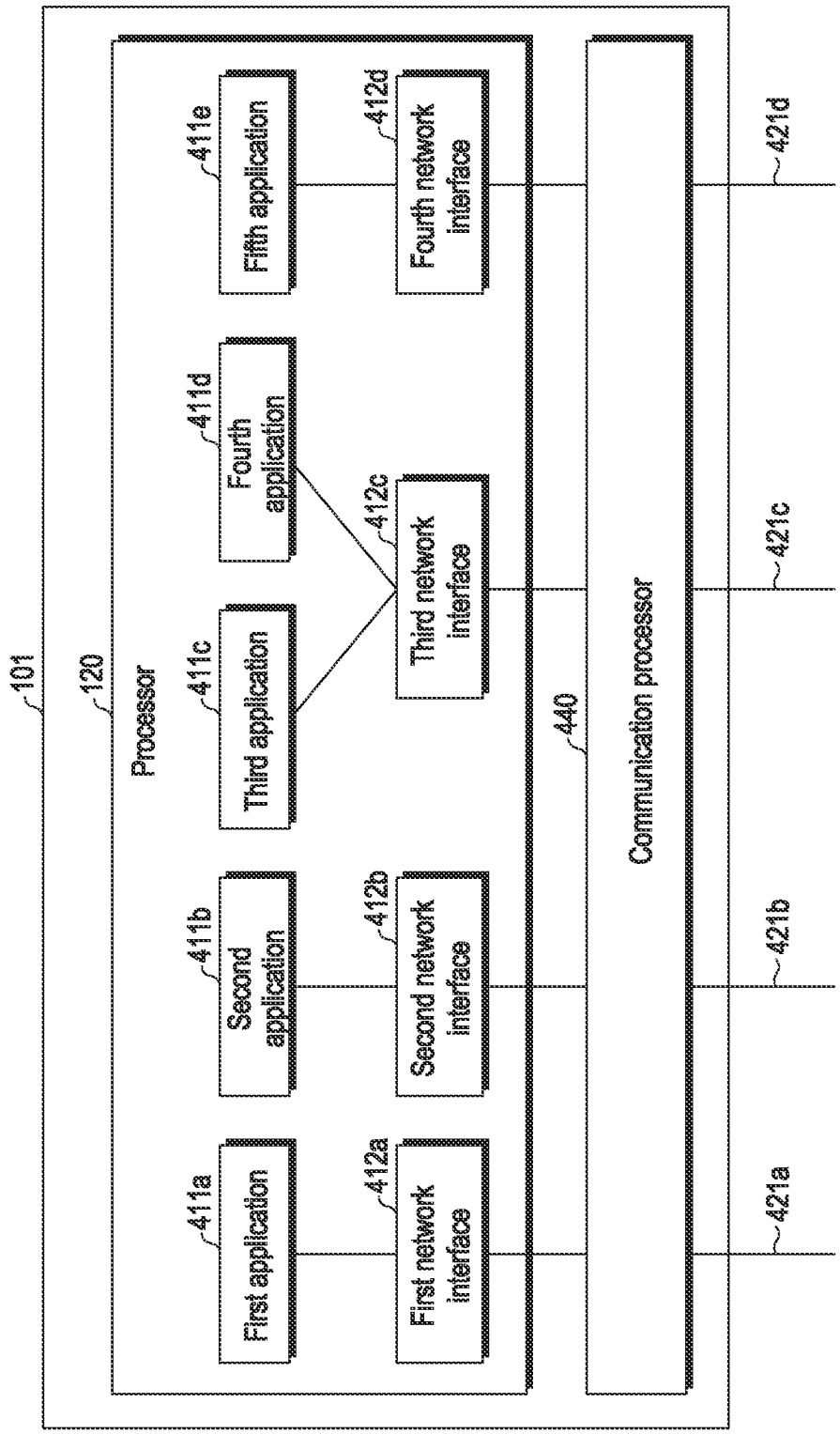
FIG. 4 is a block diagram illustrating an electronic device according to various embodiments.

FIG. 4 is a block diagram illustrating an electronic device according to various embodiments.

According to various embodiments, at least one of a first application 411a, a second application 411b, a third application 411c, a fourth application 411d, or a fifth application 411e may be executed on the processor 120. For example, the first application 411a may be an application associated with the DNN of the internet protocol multimedia subsystem (IMS). For example, the second application 411b, the third application 411c, and the fourth application 411d are applications that support general data transmission and reception and may be applications associated with, e.g., the data network name (DNN) of the Internet. For example, the fifth application 411e is an application for using a system network and may be an application for using a carrier network.

According to various embodiments, a communication processor 440 (e.g., at least one of the first communication processor 212, the second communication processor, or the integrated communication processor 260) may establish a first PDU session 421a corresponding to the DNN of the IMS. For example, if a network connection of the first application 411a is requested, the electronic device 101 (e.g., the processor 120 and/or the communication processor 440) may establish the first PDU session 421a corresponding to the carrier network. Meanwhile, it is merely exemplary that the first PDU session 421a is established based on the network connection request of the first application 411a, and the time of establishment is not specifically limited. If the first PDU session 421a corresponding to the carrier network has already been established, the electronic device 101 may associate the first application 411a with the first PDU session 421a in response to the network connection request from the first application 411a. The electronic device 101 may form a first network interface 412a for transmission/reception of data packets between the processor 120 and the communication processor 440. For example, the processor 120 may provide a data packet from the first application 411a to the communication processor 440 through the first network interface 412a. It will be appreciated by one of ordinary skill in the art that a TCP/IP layer (not shown) is defined between the applications 411a, 411b, 411c, 411d, and 411e and the network interfaces 412a, 412b, 412c, and 412d so that data packets may be transmitted/received through TCP/IP. The communication processor 440 may transmit the data packet provided through the first network interface 412a using the first PDU session 421a. It will be understood by one of ordinary skill in the art that a signal corresponding to the data packet from the communication processor 440 may be transmitted to the outside through an RF circuit (e.g., an RFIC, an RFFE, and/or an antenna module). Alternatively, the communication processor 440 may provide a data packet corresponding to the signal received through the first PDU session 421a to the processor 120 through the first network interface 412a. The processor 120 may provide the data packet received through the first network interface 412a to the first application 411a matched thereto. The "network interface" may be, e.g., a logical interface for data transmission/reception between the processor 120 and the communication processor 440 and may be named, e.g., "rmnet".

As described above, according to various embodiments, the electronic device 101 may establish the first PDU session 421d or associate the first application 411a with the previously established first PDU session 421a based on a network connection request of the first application 411a. The first application 411a may be associated with, e.g., IMS DNN, and may also be associated with the slice type of URLLC. For example, the electronic device 101 may receive the URSP rule from the PCF (e.g., the PCF 307 of FIGS. 3A and 3B) through the AMF (e.g., the AMF 303 of FIGS. 3A and 3B) (or through a different route). The URSP rule may include a traffic descriptor and/or a route selection descriptor. For example, an application identifier of the first application 411a may be included in the traffic descriptor of the URSP rule, and the IMS DNN and the slice type of URLLC may be included in the route selection descriptor. The electronic device 101 may associate the first application 411a with the first PDU session 421a based on the URSP. The electronic device 101 may perform data transmission/reception between the first application 411a and the first PDU session 421a through the first network interface 412a. The first PDU session 421a may be associated with, e.g., a network slice of the IMS DNN and the slice type of URLLC.

According to various embodiments, the electronic device 101 may establish the second PDU session 421b or associate the second application 411b with the previously established second PDU session 421b based on a network connection request of the second application 411b. The second application 411b may be associated with, e.g., Internet DNN, and may also be associated with the slice type of eMBB. For example, an application identifier of the second application 411b may be included in the traffic descriptor of the URSP rule, and the Internet DNN and the slice type of eMBB may be included in the route selection descriptor. The electronic device 101 may associate the second application 411b with the second PDU session 421b based on the URSP. The electronic device 101 may perform data transmission/reception between the second application 411b and the second PDU session 421b through the second network interface 412b. The second PDU session 421b may be associated with, e.g., a network slice of the Internet DNN and the slice type of eMBB.

According to various embodiments, the electronic device 101 may establish the third PDU session 421c or associate the third application 411c with the previously established third PDU session 421c based on a network connection request of the third application 411c. The electronic device 101 may establish the third PDU session 421c or associate the fourth application 411d with the previously established third PDU session 421c based on a network connection request of the fourth application 411d. The third application 411c and the fourth application 411d may be associated with, e.g., Internet DNN, and may also be associated with the slice type of URLLC. For example, the traffic descriptor of the URSP rule managed by the electronic device 101 may include application identifiers of the third application 411c and the fourth application 411d, and the route selection descriptor may contain the Internet DNN and the slice type of URLLC. The electronic device 101 may associate the third application 411c and the fourth application 411d with the third PDU session 421c based on the URSP. The electronic device 101 may perform data transmission/reception between the third application 411c and the fourth application 411d and the third PDU session 421c through the third network interface 412c. The third PDU session 421c may be associated with, e.g., a network slice of the Internet DNN and the slice type of URLLC. According to various embodiments, the electronic device 101 may establish the fourth PDU session 421d or associate the fifth application 411e with the previously established fourth PDU session 421d corresponding to the carrier network based on a network connection request of the fifth application 411e.

A counterfeit application of the first application 411a may be installed on the electronic device 101. The package name of the counterfeit application may be set to be the same as the package name of the first application 411a. When the network and the electronic device 101 manage the OSAppId of the application descriptor included in the traffic descriptor with only the package name, the electronic device 101 may establish the first PDU session 421a or associate the counterfeit application with the previously established first PDU session 421a in response to the network connection request from the counterfeit application. For example, the electronic device 101 may identify that the OSAppId of the counterfeit application is the same as the OSAppId included in the URSP rule, and may establish a first PDU session 421a of the slice type of URLLC and the DNN of IMS, which is the route selection descriptor corresponding to the OSAppId. Accordingly, there is a possibility that the counterfeit application that is not allowed by the network operator and the manufacturer of the electronic device 101 (or the creator of the first application 411a) may use the network slice. The electronic device 101 according to various embodiments may manage the URSP rule including the application descriptor including information for verification as well as the package name. The information for verification is less likely to be exposed unlike the package name of the application, and accordingly, it is relatively unlikely that a counterfeit application reflecting the information for verification will be produced. When a network connection request is received from a specific application (or at various times to be described below), the electronic device 101 may verify whether the corresponding application has authority to use the network slice using information for verification included in the URSP rule. As the use of the network slice is allowed only for the successfully verified application, the use of the network slice by the counterfeit application may be prevented. Hereinafter, a method for verifying whether an application has authority to use a network slice using information for verification is described.

Figure 5:
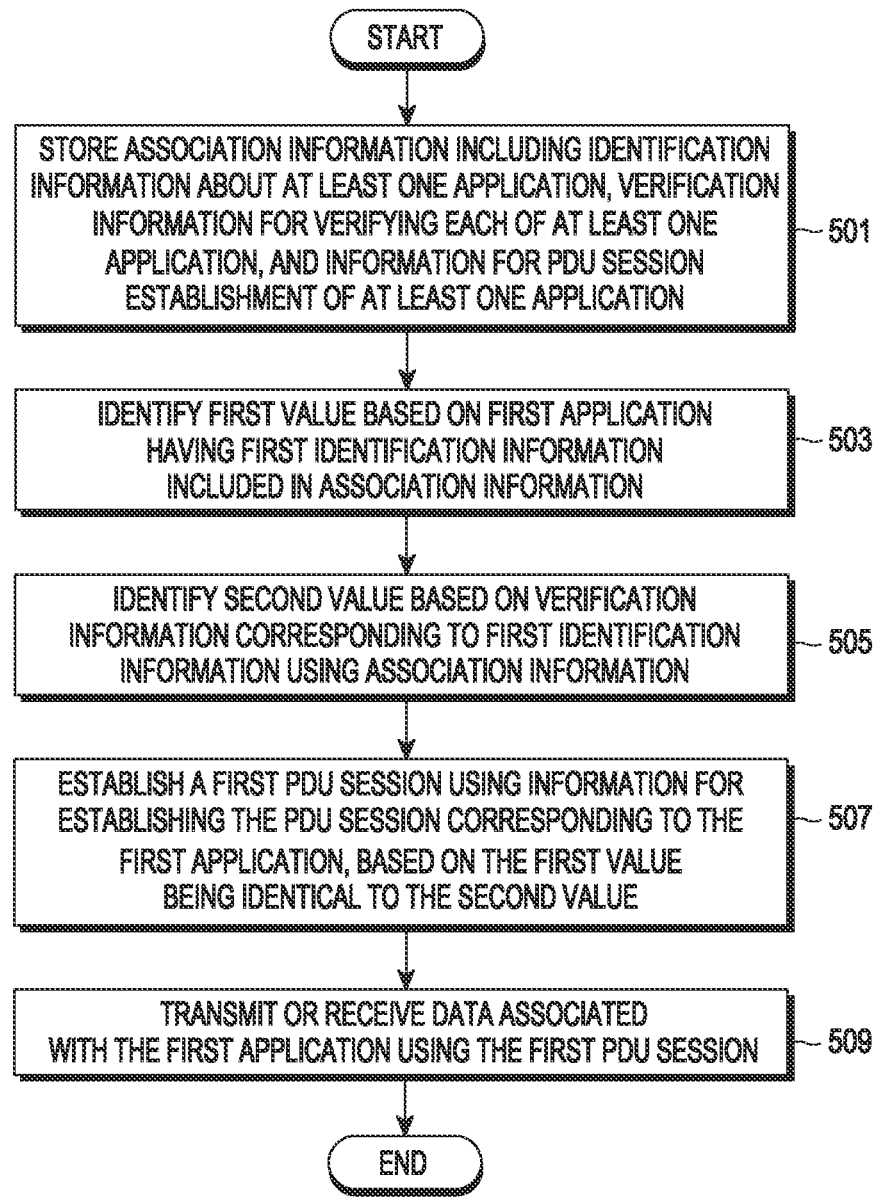
FIG. 5 is a flowchart illustrating an operation method of an electronic device according to various embodiments.

FIG. 5 is a flowchart illustrating an operation method of an electronic device according to various embodiments.

According to various embodiments, in operation 501, the electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may store association information including identification information (e.g., OSAppID) about at least one application, verification information for verifying each of the at least one application, and information (e.g., route selection descriptor) for PDU session establishment of the at least one application. For example, the electronic device 101 may receive the URSP rule from the PCF 307. It is merely exemplary that the electronic device 101 receives the URSP rule from the PCF 307, and the electronic device 101 may obtain the URSP rule from various sources, or the URSP rule may be stored in a storage area of the electronic device 101. Table 1 illustrates an example of the application descriptor included in the traffic descriptor of the URSP rule obtained by the electronic device 101.

TABLE 1

| OSId | OSAppId | | |
|---|---|---|---|
| (example) Android iOS | application identification information (example) package name bundle ID | verification type (example) signing key method hash key method token method | verification value (example) signing key hashing result token |

OSId may be the identifier for identifying the operating system (OS), and its value may follow, e.g., IETF RFC 4122, but is not limited thereto. In Table 1, Android, iOS, etc. are provided, but the type of operating system is not limited. OSAppID may be an application that is uniquely identified within the user device for a given OS and an identifier associated with the given application. The OSAppID value may include, e.g., an application identifier specified in the OS, but 3GPP does not limit its coding. Conventionally, as application identification information, e.g., such information as the package name or bundle ID, is used in the field of the OSAppID, use of the network slice by a counterfeit application having the same application identification information described with reference to FIG. 4 may not be prevented. Meanwhile, the type of application identification information is not limited. The electronic device 101 according to various embodiments may store and manage a URSP rule further including information for verification (e.g., the verification type and/or the verification value in Table 1), thereby preventing a counterfeit application from using the network slice, which is described below. The verification type is a method for verifying whether a specific application is allowed to use a specific network slice. Table 1 includes a signing key method, a hash key method, and a token method as examples, but the method is not limited thereto. The verification values are values used in each verification type, and may include, but are not limited to, e.g., a signing key used in the signing key method, a hashing result used in the hash key method, and a token used in the token method. It will be understood by one of ordinary skill in the art that the URSP rule includes a route selection descriptor corresponding to the traffic descriptor including the application descriptor of Table 1.

According to various embodiments, in operation 503, the electronic device 101 may identify the first value based on the first application having the first identification information included in the association information. In one example, the electronic device 101 may read the first value for verification at the location (or address) where the first application is stored. For example, if the verification type is the signing key method, the electronic device 101 may read the certificate information through the API of PackageInfo corresponding to the first identification information (e.g., package name) about the first application, and may read the signing key as the first value in the certificate information. For example, if the verification type is the hash key method, the electronic device 101 may read the key from the location (or address) where the first application is stored and may identify the result of performing hashing on the read key as the first value. For example, when the verification type is the token method, if a network connection request is obtained from the first application, the electronic device 101 may identify the token included therein as the first value.

According to an embodiment, the electronic device 101 may identify the second value based on the verification information corresponding to the first identification information using the association information in operation 505. For example, when the verification type is the signing key method, the electronic device 101 may identify the signing key corresponding to the first identification information (e.g., the package name) as the second value in the association information as shown in Table 1. For example, when the verification type is the hash key method, the electronic device 101 may identify the hashing result corresponding to the first identification information (e.g., the package name) as the second value in the association information as shown in Table 1. For example, if the verification type is the token method, the electronic device 101 may identify the token corresponding to the first identification information (e.g., the package name) as the second value in the association information as shown in Table 1. Meanwhile, FIG. 5 illustrates that operation 505 is performed after operation 503 is performed, but this is merely exemplary, and the execution order is not limited, and the operations may be performed in parallel, i.e., at the same time.

According to an embodiment, the electronic device 101 may establish a PDU session using the information for PDU session establishment corresponding to the first application based on the first value and the second value being the same in operation 507. For example, when the first value identified based on the first application is the same as the second value included in the URSP rule, the electronic device 101 may determine that the first application has authority to use the network slice allowed by the URSP rule. The electronic device 101 may transmit a PDU session establishment request message to the network, based on the information for PDU session establishment which is at least a part of the route selection descriptor corresponding to the first identification information. The network and the electronic device 101 may establish a PDU session based on the PDU session establishment request message. In operation 509, the electronic device 101 may transmit and/or receive data associated with the first application using the established PDU session.

If the first value and the second value are not the same, the electronic device 101 may determine that the installed first application does not have the authority to use the network slice allowed in the URSP rule. In this case, the electronic device 101 may refrain from establishing the PDU session corresponding to the information for the PDU session corresponding to the first identification information. The electronic device 101 may refrain from establishing a new PDU session for the first application and/or associating with the existing PDU session. Alternatively, the electronic device 101 may establish a PDU session (e.g., a PDU session of an Internet DNN) unrelated to the network slice, and/or may associate the first application with the existing PDU session.

Figure 6:
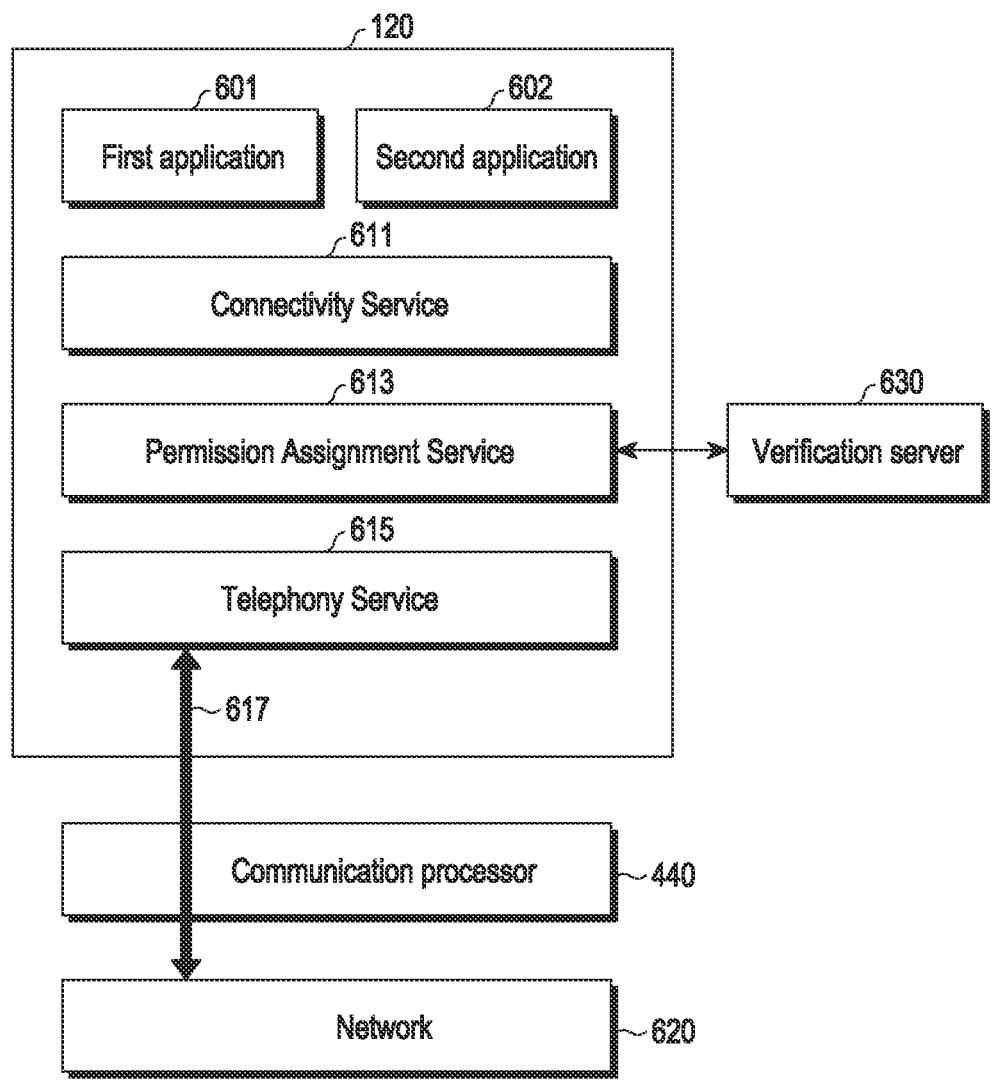
FIG. 6 is a block diagram illustrating an electronic device according to various embodiments.

FIG. 6 is a block diagram illustrating an electronic device according to various embodiments.

According to various embodiments, any one of the first application 601 and the second application 602 may be installed and executed on the processor 120. For example, it is assumed that the first application 601 is a genuine application, and the second application 602 is a counterfeit application simulating the first application 601. For example, the first application 601 and the second application 602 may have the same application identification information (e.g., a package name). Any one of the first application 601 and the second application 602 may be executed in, e.g., an application (e.g., the application 146 of FIG. 1) layer, but is not limited thereto. Any one of the first application 601 and the second application 602 executed on the processor 120 may transmit/receive data to and from the network 620 through the communication processor 440.

According to various embodiments, at least one of a ConnectivityService 611, a PermissionAssignmentService 613, or a TelephonyService 615 may be executed on the processor 120. The operation of at least one of the ConnectivityService 611, PermissionAssignmentService 613, or TelephonyService 615 may mean the operation of the application processor (e.g., the processor 120) or the electronic device 101.

According to various embodiments, when the application requests a network connection, the ConnectivityService 611 may identify whether the application has authority to use a specific network slice through the PermissionAssignmentService 613. For example, when the network connection request is identified from the first application 601 or the second application 602, the ConnectivityService 611 may request the PermissionAssignmentService 613 to identify whether the corresponding application has authority to use the network slice. The PermissionAssignmentService 613 may identify whether the corresponding application has authority to use the network slice, and may provide the result thereof to the ConnectivityService 611. According to the received identification result, the ConnectivityService 611 may proceed with PDU session establishment (or association) based on the network connection request of the corresponding application or may refrain from PDU session establishment (or association) associated with the corresponding network slice. If it is determined to establish the PDU session, the ConnectivityService 611 may request the TelephonyService 615 to establish a network. The TelephonyService 615 may transmit a PDU session establishment request message to the network 620 through the communication processor 440 (or a protocol stack executed on the communication processor 440), and thus a PDU session may be established. Meanwhile, the example of identifying whether the application is authorized at the time of requesting network connection is merely exemplary, and whether the application is authorized may be identified at various time points to be described below.

According to various embodiments, the PermissionAssignmentService 613 may receive and store the URSP rule from the network 620 (e.g., the PCF 307). For example, as shown in Table 1, the application descriptor included in the traffic descriptor of the URSP rule may include application identification information and information for verification. The PermissionAssignmentService 613 may identify whether a specific application is authorized based on a request from the ConnectivityService 611. For example, the PermissionAssignmentService 613 may identify whether the specific application is authorized, based on a comparison result between the first value obtained based on the corresponding application and the second value included in the URSP rule. Meanwhile, as is described below, the electronic device 101 may determine whether the network slice is available using a verification server method using the verification server 630. In this case, the PermissionAssignmentService 613 may transmit the token to the verification server 630, receive a refresh token from the verification server 630, and determine whether the network slice is available according to whether the refresh token is received. The verification server 630 may issue (or stop issuing) a refresh token based on the token received from the PermissionAssignmentService 613, which is described below.

For example, the PermissionAssignmentService 613 may obtain a first value based on the first application 601, and may provide information indicating that the first application 601 is valid to the ConnectivityService 611 based on the value included in the URSP rule being the same as the first value. The ConnectivityService 611 may request the TelephonyService 615 to establish a PDU session corresponding to the first application 601, and thus the PDU session 617 corresponding to the first application 601 may be established. The PermissionAssignmentService 613 may obtain the second value based on the second application 602, and may provide information indicating that the second application 602 is invalid to the ConnectivityService 611 based on the value included in the URSP rule being not the same as the second value. The ConnectivityService 611 may refrain from establishing a PDU session corresponding to the second application 602 or may proceed with establishing a default PDU session.

According to various embodiments, the TelephonyService 615 may be included in, e.g., a radio interface layer (RIL). If identification information about the application allowed to use a specific network slice is received from the communication processor 440, the TelephonyService 615 may provide information necessary for establishing the PDU session to the communication processor 440 (or a protocol stack executed on the communication processor 440).

According to various embodiments, the communication processor 440 may transfer the application identification information (e.g., a list) transferred from the network 620 to the application processor (e.g., the processor 120). The communication processor 440 may read identification information for the application allowed for the carrier network from a specific memory area in the communication processor 440 or a SIM card. The communication processor 440 may transfer the identification information for the application allowed for the carrier network to the PermissionAssignmentService 613. If the communication processor 440 receives a request to establish a PDU session from the processor 120, the communication processor 440 may establish a PDU session based on information from the processor 120.

Figure 7A:
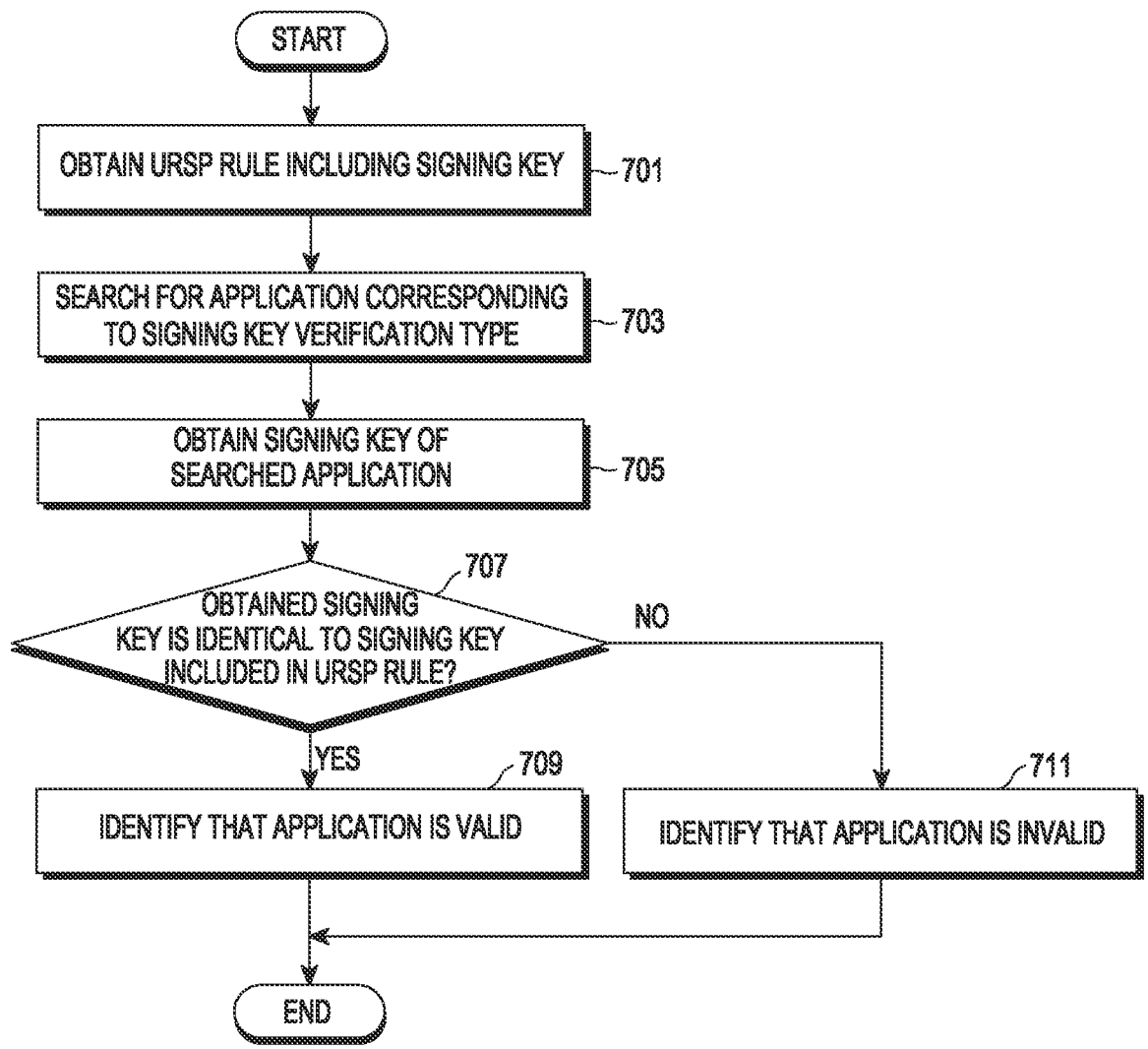
FIG. 7A is a flowchart illustrating an operation method of an electronic device according to various embodiments.

FIG. 7A is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a signing key in operation 701. For example, the application descriptor included in the URSP rule obtained by the electronic device 101 may be as shown in Table 2.

TABLE 2

| OSId | | OSAppId | |
|---|---|---|---|
| Android | application identification information | verification type | verification value |
| | com.company.ursp | SingingKey | first value |

In Table 2, "com.company.ursp", which is application identification information, may be, e.g., the package name, "SingingKey", which is the verification type, may indicate the signing key method, and "first value", which is the verification value, is the value of the signing key and may be implemented as a combination of characters and/or numbers. Although Table 2 includes information on one piece of application identification information, those skilled in the art will understand that the URSP rule may include one or more pieces of application identification information and information for verification corresponding to each thereof. Meanwhile, the application descriptor in the URSP rule of Table 2 may be implemented in, e.g., a JSON format, and in this case, may have an implementation form as shown in Table 3.

TABLE 3

{ "AppID" : "com.company.ursp",
"Type" : "SingingKey",
"Key" : "first value"
}

Meanwhile, the JSON format is merely exemplary, and there is no limitation on the method for expressing the URSP rule.

According to various embodiments, the electronic device 101 may search for an application corresponding to the signing key method in operation 703. In Table 2, the electronic device 101 may search whether an application having application identification information (e.g., a package name of "com.company.ursp") having the verification type of SingingKey is stored and/or installed on the electronic device 101. For example, it is assumed that an application having a package name of "com.company.ursp" is installed on the electronic device 101. In operation 705, the electronic device 101 may obtain the signing key of the searched application. For example, the electronic device 101 may obtain the signing key at the storage location (e.g., from the certificate) of the application having the package name of "com.company.ursp". For example, it is assumed that the verification value of the URSP rule as shown in Table 2 is set as the first value. If the application of the package name of "com.company.ursp" is a genuine application, the first value may be obtained, and if the application of the package name of "com.company.ursp" is a counterfeit application, the second value may be obtained.

According to various embodiments, in operation 707, the electronic device 101 may determine whether the signing key obtained based on the searched application is the same as the signing key included in the URSP rule. When the signing key obtained based on the searched application is the same as the signing key included in the URSP rule (yes in operation 707), the electronic device 101 may identify that the application is valid in operation 709. When the signing key obtained based on the searched application is not the same as the signing key included in the URSP rule (no in operation 707), the electronic device 101 may identify that the application is invalid in operation 711. For example, when the first value obtained based on the application is the same as the first value included in the URSP rule, the electronic device 101 may identify that the installed application having the package name of "com.company.ursp" is valid. For example, when the second value obtained based on the application and the first value included in the URSP rule are not the same, the electronic device 101 may identify that the installed application having the package name of "com.company.ursp" is invalid.

As described above, even before the network connection request is obtained from the application, the electronic device 101 may identify whether the application corresponding to the signing key method is valid based on the URSP rule being obtained. After it is identified whether it is valid, the electronic device 101 may obtain a network connection request from the application. If it is identified that the application is valid, the electronic device 101 may establish a PDU session for the application or may associate the application with the previously established PDU session. If it is identified that the application is invalid, the electronic device 101 may refrain from establishing a PDU session for the application. In this case, the electronic device 101 may refrain from network connection of the corresponding application, or may establish a PDU session not requiring authority and/or associate it to the PDU session.

Figure 7B:
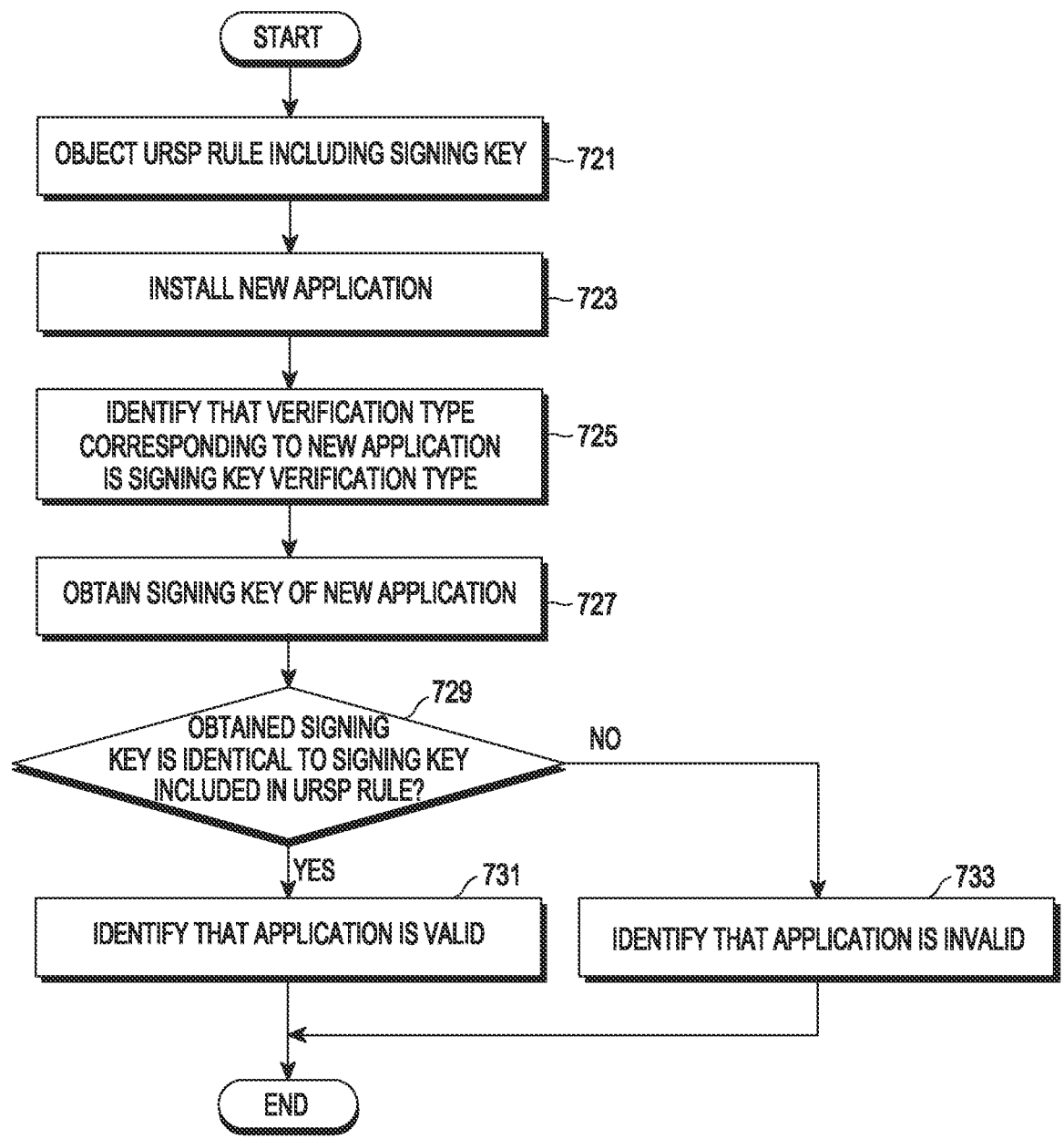
FIG. 7B is a flowchart illustrating an operation method of an electronic device according to various embodiments.

FIG. 7B is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a signing key in operation 721. For example, the electronic device 101 may obtain a URSP rule as shown in Table 2. In operation 723, the electronic device 101 may install a new application. For example, it is assumed that after the URSP rule corresponding to the identification information about the new application is obtained, a new application is installed on the electronic device 101. In operation 725, the electronic device 101 may identify that the verification type corresponding to the new application is the signing key method. For example, it is assumed that a new application having a package name of "com.company.ursp" is installed on the electronic device 101. The electronic device 101 may identify that the package name of the installed new application is included in the application identification information about the URSP rule of Table 2. The electronic device 101 may identify that the verification type corresponding to the package name of "com.company.ursp" in the URSP rule of Table 2 is the signing key method.

According to various embodiments, the electronic device 101 may obtain the signing key of the new application in operation 727. For example, the electronic device 101 may obtain the signing key at the storage location (e.g., from the certificate) of the application having the package name of "com.company.ursp". For example, it is assumed that the verification value of the URSP rule as shown in Table 2 is set as the first value. If the new application of the package name of "com.company.ursp" is a genuine application, the first value may be obtained, and if the new application of the package name of "com.company.ursp" is a counterfeit application, the second value may be obtained. According to various embodiments, in operation 729, the electronic device 101 may determine whether the signing key obtained based on the new application is the same as the signing key included in the URSP rule. When the signing key obtained based on the new application is the same as the signing key included in the URSP rule (yes in operation 729), the electronic device 101 may identify that the new application is valid in operation 731. When the signing key obtained based on the new application is not the same as the signing key included in the URSP rule (no in operation 729), the electronic device 101 may identify that the new application is invalid in operation 733. For example, when the first value obtained based on the new application is the same as the first value included in the URSP rule, the electronic device 101 may identify that the newly installed application having the package name of "com.company.ursp" is valid. For example, when the second value obtained based on the new application and the first value included in the URSP rule are not the same, the electronic device 101 may identify that the newly installed application having the package name of "com.company.ursp" is invalid.

As described above, even before the network connection request is obtained from the new application, the electronic device 101 may identify whether the new application corresponding to the signing key method is valid based on the application being installed. After it is identified whether it is valid, the electronic device 101 may obtain a network connection request from the new application. If it is identified that the new application is valid, the electronic device 101 may establish a PDU session for the new application or may associate the new application with the previously established PDU session. If it is identified that the new application is invalid, the electronic device 101 may refrain from establishing a PDU session for the new application. In this case, the electronic device 101 may refrain from network connection of the new application, or may establish a PDU session not requiring authority and/or associate it to the PDU session.

Figure 7C:
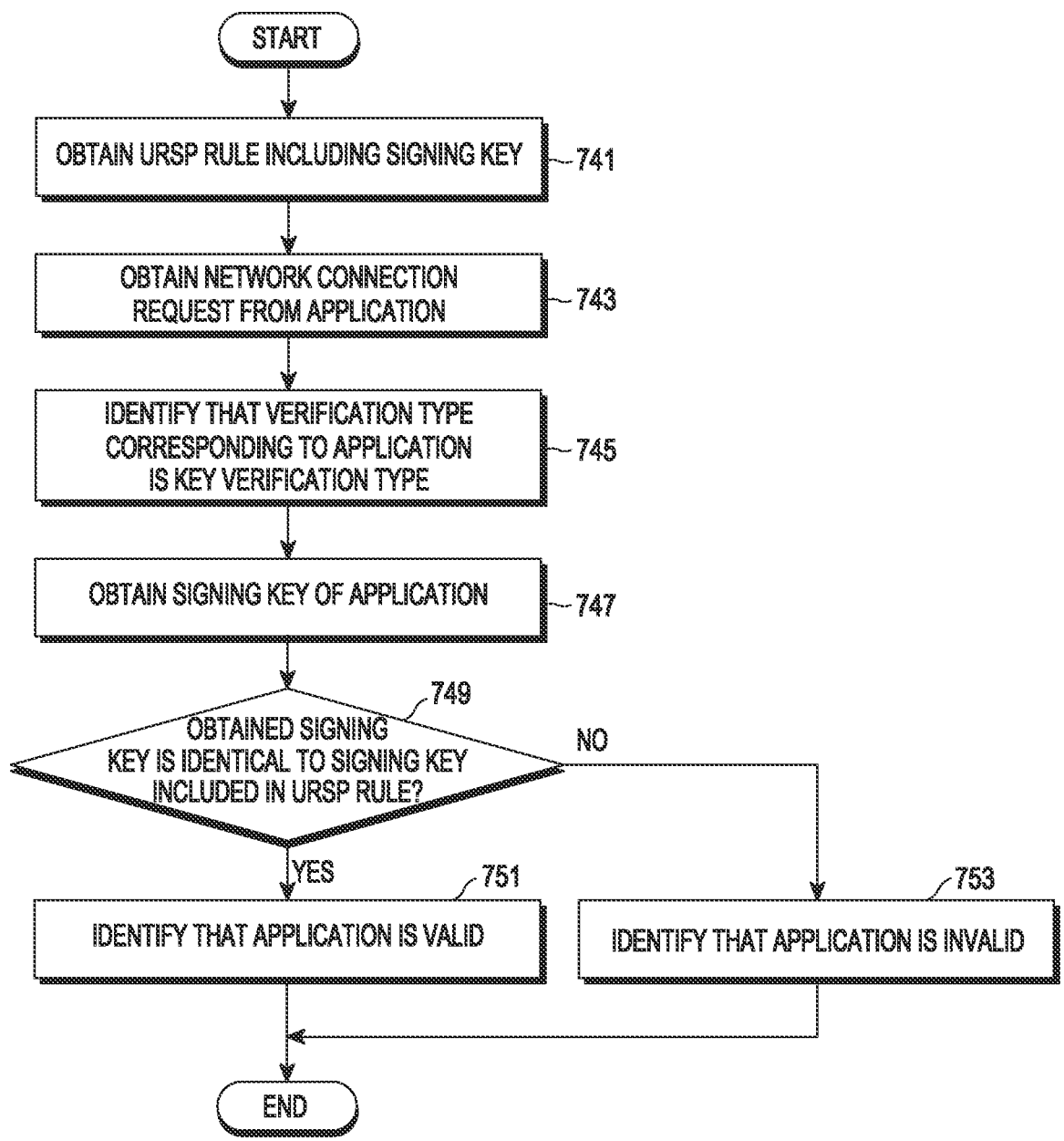
FIG. 7C is a flowchart illustrating an operation method of an electronic device according to various embodiments.

FIG. 7C is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a signing key in operation 741. For example, the electronic device 101 may obtain a URSP rule as shown in Table 2. In operation 743, the electronic device 101 may obtain a network connection request from the installed application. In operation 745, the electronic device 101 may identify that the verification type corresponding to the application requesting the network connection is the signing key method. For example, it is assumed that an application having a package name of "com.company.ursp" sends a request for network connection to the electronic device 101. The electronic device 101 may identify that the package name of the application requesting network connection is included in the application identification information about the URSP rule of Table 2. The electronic device 101 may identify that the verification type corresponding to the package name of "com.company.ursp" in the URSP rule of Table 2 is the signing key method.

According to various embodiments, the electronic device 101 may obtain the signing key of the application requesting network connection in operation 747. For example, the electronic device 101 may obtain the signing key at the storage location (e.g., from the certificate) of the application having the package name of "com.company.ursp". For example, it is assumed that the verification value of the URSP rule as shown in Table 2 is set as the first value. If the application of the package name of "com.company.ursp" is a genuine application, the first value may be obtained, and if the application of the package name of "com.company.ursp" is a counterfeit application, the second value may be obtained. According to various embodiments, in operation 749, the electronic device 101 may determine whether the signing key obtained based on the application is the same as the signing key included in the URSP rule. When the signing key obtained based on the application is the same as the signing key included in the URSP rule (yes in operation 749), the electronic device 101 may identify that the application is valid in operation 751. When the signing key obtained based on the application is not the same as the signing key included in the URSP rule (no in operation 749), the electronic device 101 may identify that the application is invalid in operation 753. For example, when the first value obtained based on the application is the same as the first value included in the URSP rule, the electronic device 101 may identify that the installed application having the package name of "com.company.ursp" which requests network connection is valid. For example, when the second value obtained based on the application and the first value included in the URSP rule are not the same, the electronic device 101 may identify that the installed application having the package name of "com.company.ursp" which requests network connection is invalid.

If it is identified that the application requesting network connection is valid, the electronic device 101 may establish a PDU session for the application or may associate the new application with the previously established PDU session. If it is identified that the application requesting network connection is invalid, the electronic device 101 may refrain from establishing a PDU session for the application. In this case, the electronic device 101 may refrain from network connection of the application, or may establish a PDU session not requiring authority and/or associate it to the PDU session.

Figure 8:
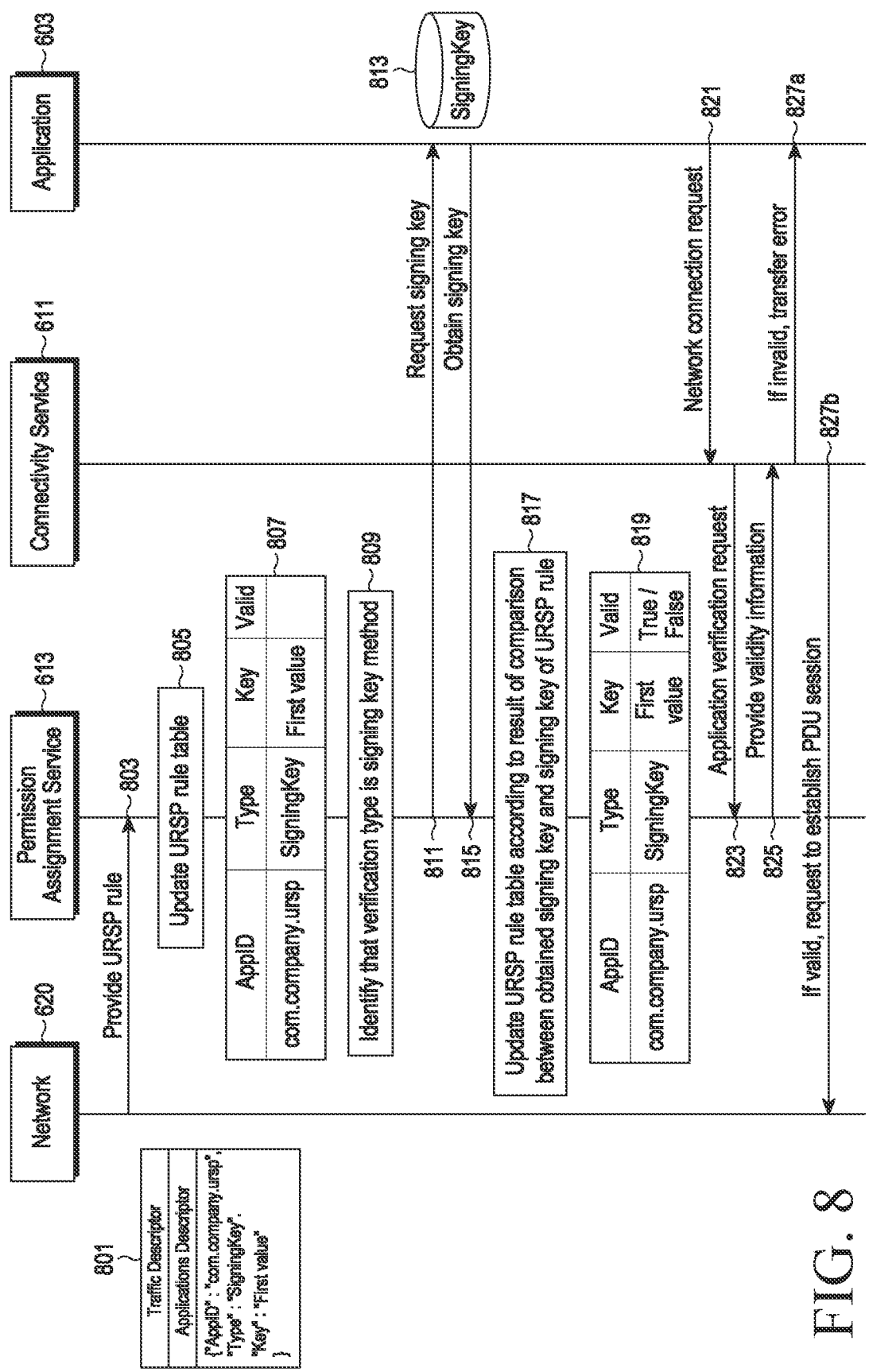
FIG. 8 is a flowchart illustrating a method for operating an electronic device according to various embodiments.

FIG. 8 is a flowchart illustrating a method for operating an electronic device according to various embodiments. As described with reference to FIG. 6, the operations of the ConnectivityService 611 and the PermissionAssignmentService 613 may be performed by the electronic device 101. It is assumed that the application 603 is stored and/or installed on the electronic device 101.

According to various embodiments, the network 620 may store the URSP rule 801. For example, the URSP rule 801 may be configured in a JSON format as shown in Table 3, but the expression format is not limited as described above. The network 620 may provide the URSP rule 801 to the electronic device 101 in operation 803, and for example, the PermissionAssignmentService 613 may receive and store the URSP rule 801. The PermissionAssignmentService 613 may update the URSP rule table 807 in operation 805. In one example, the URSP rule table 807 managed by the electronic device 101 may include application identification information (AppID) (e.g., a package name), a verification type, a value for verification (e.g., a key), and whether it is valid. Before the validity corresponding to specific application identification information is verified, the validity field of the URSP rule table 807 may be emptied. In operation 809, the PermissionAssignmentService 613 may identify that the verification type is the signing key method. The PermissionAssignmentService 613 may search for an application corresponding to the signing key method. In the example of FIG. 8, it is assumed that the application 603 is an application corresponding to the signing key method.

According to various embodiments, in operation 811, the PermissionAssignmentService 613 may request a signing key from the application 603. In operation 815, the PermissionAssignmentService 613 may obtain a signing key 813 from the application 603. Operations 811 and 815 may be, e.g., reading the signing key 813 at the storage location (e.g., the storage location of the certificate) of the application 603. In operation 817, the PermissionAssignmentService 613 may update the URSP rule table 819 based on a result of comparing the obtained signing key 813 with the signing key of the URPS rule 801. Whether the updated URSP rule table 819 is valid may include any one of true or false. For example, when the signing key 813 obtained in operation 815 and the signing key included in the URSP rule 801 are the same, true may be included in whether the URSP rule table 819 is valid. For example, when the signing key 813 obtained in operation 815 and the signing key included in the URSP rule 801 are not the same, false may be included in whether the URSP rule table 819 is valid.

According to various embodiments, in operation 821, the ConnectivityService 611 may receive a network connection request from the application 603. In operation 823, the ConnectivityService 611 may request the PermissionAssignmentService 613 to verify the application 603. In operation 825, the PermissionAssignmentService 613 may provide validity information about the application 603 to the ConnectivityService 611. The PermissionAssignmentService 613 may provide validity information about the application 603 to the ConnectivityService 611 based on whether is valid corresponding to the application identification information in the URSP rule table 819. If the ConnectivityService 611 obtains false validity information, error information may be transferred to the application 603 in operation 827a. If the ConnectivityService 611 obtains true validity information, the ConnectivityService 611 may request the network 620 to establish a PDU session, e.g., through the TelephonyService 615, in operation 827b.

Figure 9A:
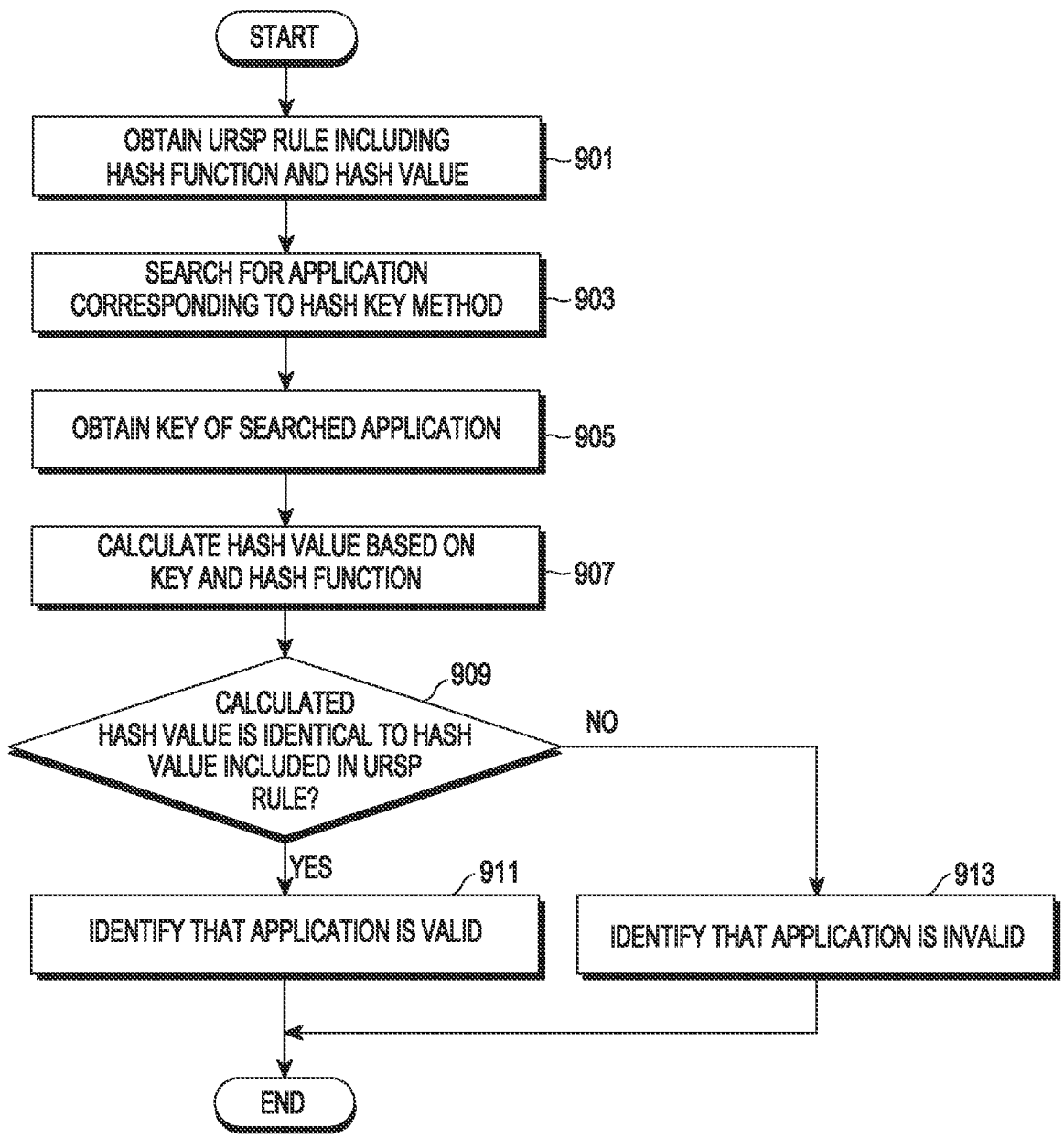
FIG. 9A is a flowchart illustrating an operation method of an electronic device according to various embodiments.

FIG. 9A is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a hash function and a hash value in operation 901. For example, the application descriptor included in the URSP rule obtained by the electronic device 101 may be as shown in Table 4.

TABLE 4

| OSId | OSAppId | | | |
|---|---|---|---|---|
| Android | application identification information | verification type | hash function | verification value |
| | com.company.ursp | HashingKey | first hash function | first hash value |

In Table 4, "com.company.ursp", which is application identification information, may be, e.g., the package name, "HashingKey", which is the verification type, indicates the hash key method, "first hash function", which is the hash function, may be a hash function capable of performing hashing, and "first hash value", which is the verification value, may be the hash value obtained as the operation result for the hash key with the first hash function. Although Table 4 includes information on one piece of application identification information, those skilled in the art will understand that the URSP rule may include one or more pieces of application identification information and information for verification corresponding to each thereof. Meanwhile, the application descriptor in the URSP rule of Table 4 may be implemented in, e.g., a JSON format, and in this case, may have an implementation form as shown in Table 5.

TABLE 5

{ "AppID" : "com.company.ursp",
"Type" : "HashingKey",
"HashFunction" : "first hash function"
"HashValue" : "first hash value"
}

Meanwhile, the JSON format is merely exemplary, and there is no limitation on the method for expressing the URSP rule.

According to various embodiments, the electronic device 101 may search for an application corresponding to the hash key verification type in operation 903. The electronic device 101 may search whether an application having application identification information (e.g., a package name of "com.company.ursp") having the verification type of HashingKey in Table 4 is stored and/or installed on the electronic device 101. For example, it is assumed that an application having a package name of "com.company.ursp" is installed on the electronic device 101. In operation 905, the electronic device 101 may obtain the key of the searched application. For example, the electronic device 101 may obtain the key at the storage location (e.g., from the certificate) of the application having the package name of "com.company.ursp". In operation 907, the electronic device 101 may calculate the hash value based on the key and the hash function. For example, it is assumed that the verification value of the URSP rule as shown in Table 4 is set as the first hash value. If the application having the package name of "com.company.ursp" is a genuine application, the first hash value may be obtained as the operation result of the key from the application and the first hash function. If the application having the package name of "com.company.ursp" is a counterfeit application, the second hash value may be obtained as the operation result of the key from the application and the first hash function.

According to various embodiments, in operation 909, the electronic device 101 may determine whether the calculated hash value is the same as the hash value included in the URSP rule. When the calculated hash value is the same as the hash value included in the URSP rule (yes in operation 909), the electronic device 101 may identify that the application is valid in operation 911. When the calculated hash value is not the same as the hash value included in the URSP rule (no in operation 909), the electronic device 101 may identify that the application is invalid in operation 913. For example, when the first hash value calculated as the operation result of the first hash function and the key obtained from the application is the same as the first hash value included in the URSP rule, the electronic device 101 may identify that the installed application having the package name of "com.company.ursp" is valid. For example, when the second hash value calculated as the operation result of the key obtained from the application and the first hash function is not the same as the first hash value included in the URSP rule, the electronic device 101 may identify that the installed application having the package name of "com.company.ursp" is invalid.

As described above, even before the network connection request is obtained from the application, the electronic device 101 may identify whether the application corresponding to the hash key method is valid based on the URSP rule being obtained. After it is identified whether it is valid, the electronic device 101 may obtain a network connection request from the application. If it is identified that the application is valid, the electronic device 101 may establish a PDU session for the application or may associate the application with the previously established PDU session. If it is identified that the application is invalid, the electronic device 101 may refrain from establishing a PDU session for the application. In this case, the electronic device 101 may refrain from network connection of the corresponding application, or may establish a PDU session not requiring authority and/or associate it to the PDU session.

Figure 9B:
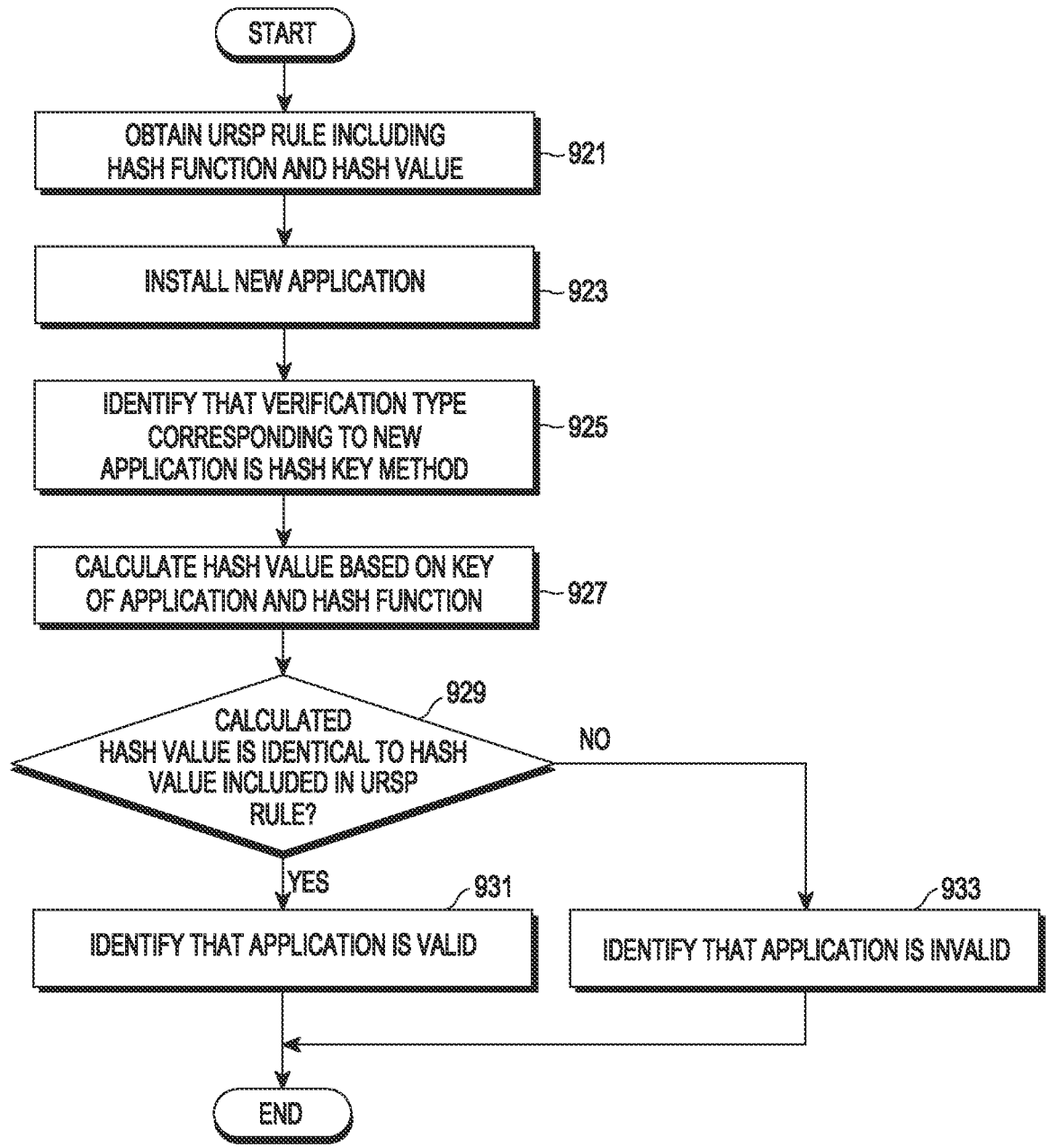
FIG. 9B is a flowchart illustrating an operation method of an electronic device according to various embodiments.

FIG. 9B is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a hash function and a hash value in operation 921. For example, the electronic device 101 may obtain a URSP rule as shown in Table 4. In operation 923, the electronic device 101 may install a new application. For example, it is assumed that after the URSP rule corresponding to the identification information about the new application is obtained, a new application is installed on the electronic device 101. In operation 925, the electronic device 101 may identify that the verification type corresponding to the new application is the hash key verification type. For example, it is assumed that a new application having a package name of "com.company.ursp" is installed on the electronic device 101. The electronic device 101 may identify that the package name of the installed new application is included in the application identification information about the URSP rule of Table 4. The electronic device 101 may identify that the verification type corresponding to the package name of "com.company.ursp" in the URSP rule of Table 4 is the hash key verification type.

According to various embodiments, the electronic device 101 may calculate the hash value based on the key of the new application and the hash function included in the URSP rule in operation 927. For example, the electronic device 101 may obtain the key at the storage location (e.g., from the certificate) of the application having the package name of "com.company.ursp". For example, it is assumed that the hash function of the URSP rule as shown in Table 4 is the first hash function and the verification value is set to the first hash value. If the new application of the package name of "com.company.ursp" is a genuine application, the first hash value may be obtained according to the operation result of the key and the first hash function, and if the new application of the package name of "com.company.ursp" is a counterfeit application, the second value may be obtained according to the operation result of the key and the first hash function. According to various embodiments, in operation 929, the electronic device 101 may determine whether the hash value calculated based on the new application is the same as the hash value included in the URSP rule. When the hash value calculated based on the new application is the same as the hash value included in the URSP rule (yes in operation 929), the electronic device 101 may identify that the new application is valid in operation 931. When the hash value calculated based on the new application is not the same as the hash value included in the URSP rule (no in operation 929), the electronic device 101 may identify that the new application is invalid in operation 933. For example, when the first hash value calculated based on the new application is the same as the first hash value included in the URSP rule, the electronic device 101 may identify that the newly installed application having the package name of "com.company.ursp" is valid. For example, when the second hash value calculated based on the new application and the first hash value included in the URSP rule are not the same, the electronic device 101 may identify that the newly installed application having the package name of "com.company.ursp" is invalid.

As described above, even before the network connection request is obtained from the new application, the electronic device 101 may identify whether the new application corresponding to the signing key method is valid based on the installation of the application. After it is identified whether it is valid, the electronic device 101 may obtain a network connection request from the new application. If it is identified that the new application is valid, the electronic device 101 may establish a PDU session for the new application or may associate the new application with the previously established PDU session. If it is identified that the new application is invalid, the electronic device 101 may refrain from establishing a PDU session for the new application. In this case, the electronic device 101 may refrain from network connection of the new application, or may establish a PDU session not requiring authority and/or associate it to the PDU session.

Figure 9C:
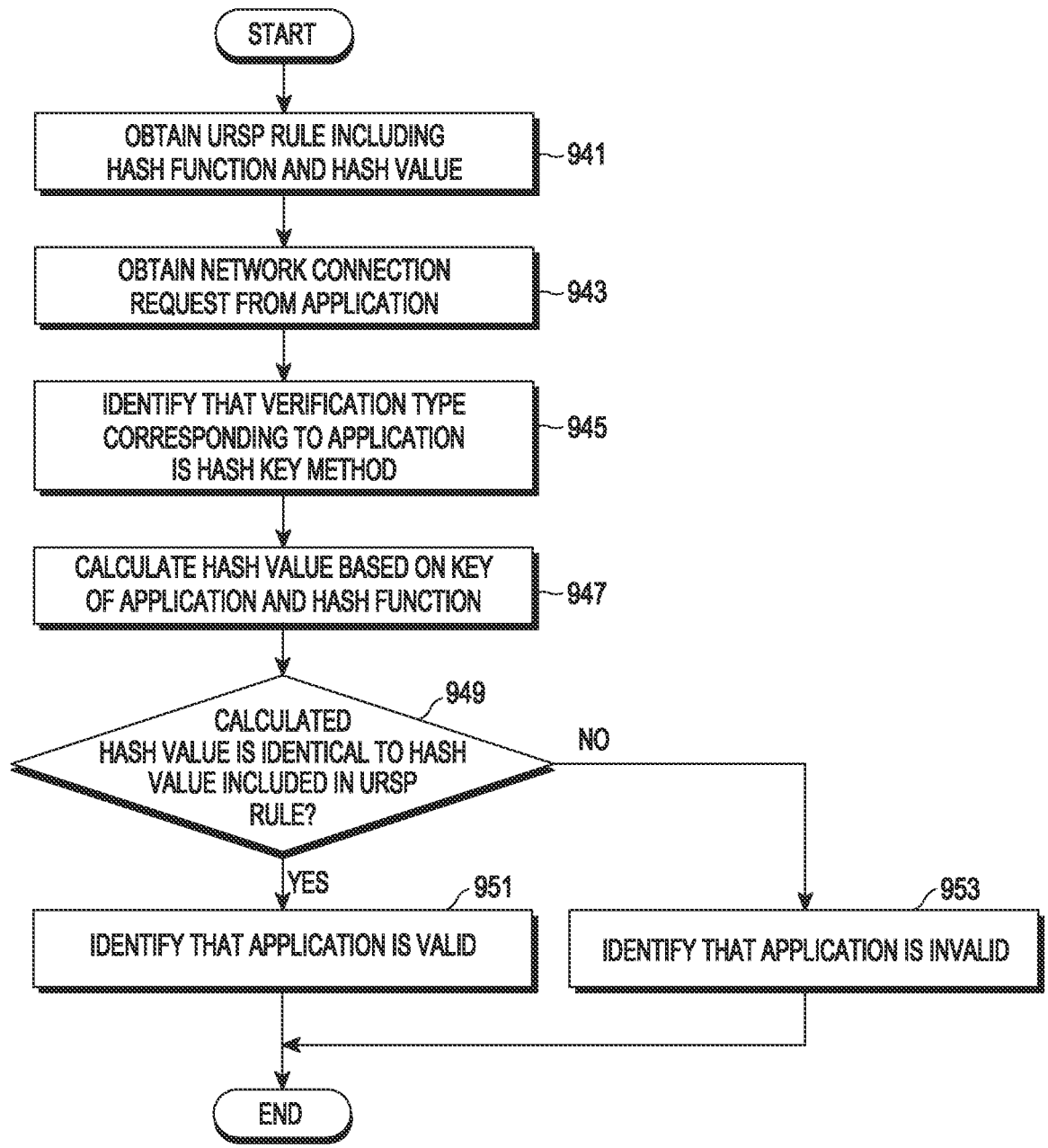
FIG. 9C is a flowchart illustrating an operation method of an electronic device according to various embodiments.

FIG. 9C is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a hash function and a hash value in operation 941. For example, the electronic device 101 may obtain a URSP rule as shown in Table 4. In operation 943, the electronic device 101 may obtain a network connection request from the installed application. In operation 945, the electronic device 101 may identify that the verification type corresponding to the application requesting the network connection is the hash key method. For example, it is assumed that an application having a package name of "com.company.ursp" sends a request for network connection to the electronic device 101. The electronic device 101 may identify that the package name of the application requesting network connection is included in the application identification information about the URSP rule of Table 4. The electronic device 101 may identify that the verification type corresponding to the package name of "com.company.ursp" in the URSP rule of Table 4 is the hash key method.

According to various embodiments, the electronic device 101 may calculate the hash value based on the key of the application requesting network connection and the hash function in operation 947. For example, the electronic device 101 may obtain the key at the storage location (e.g., from the certificate) of the application having the package name of "com.company.ursp". For example, it is assumed that the verification value of the URSP rule as shown in Table 4 is set as the first hash value. If the application having the package name of "com.company.ursp" is a genuine application, the first hash value may be obtained as the operation result of the key and the first hash function. If the application having the package name of "com.company.ursp" is a counterfeit application, the second hash value may be obtained as the operation result of the key and the first hash function. According to various embodiments, in operation 949, the electronic device 101 may determine whether the hash value calculated based on the application is the same as the hash value included in the URSP rule. When the hash value calculated based on the application is the same as the hash value included in the URSP rule (yes in operation 949), the electronic device 101 may identify that the application is valid in operation 951. When the hash value calculated based on the application is not the same as the hash value included in the URSP rule (no in operation 949), the electronic device 101 may identify that the application is invalid in operation 953. For example, when the first hash value calculated based on the application is the same as the first hash value included in the URSP rule, the electronic device 101 may identify that the installed application having the package name of "com.company.ursp" which requests network connection is valid. For example, when the second hash value calculated based on the application and the first hash value included in the URSP rule are not the same, the electronic device 101 may identify that the installed application having the package name of "com.company.ursp" which requests network connection is invalid.

If it is identified that the application requesting network connection is valid, the electronic device 101 may establish a PDU session for the application or may associate the new application with the previously established PDU session. If it is identified that the application requesting network connection is invalid, the electronic device 101 may refrain from establishing a PDU session for the application. In this case, the electronic device 101 may refrain from network connection of the application, or may establish a PDU session not requiring authority and/or associate it to the PDU session.

Figure 10:
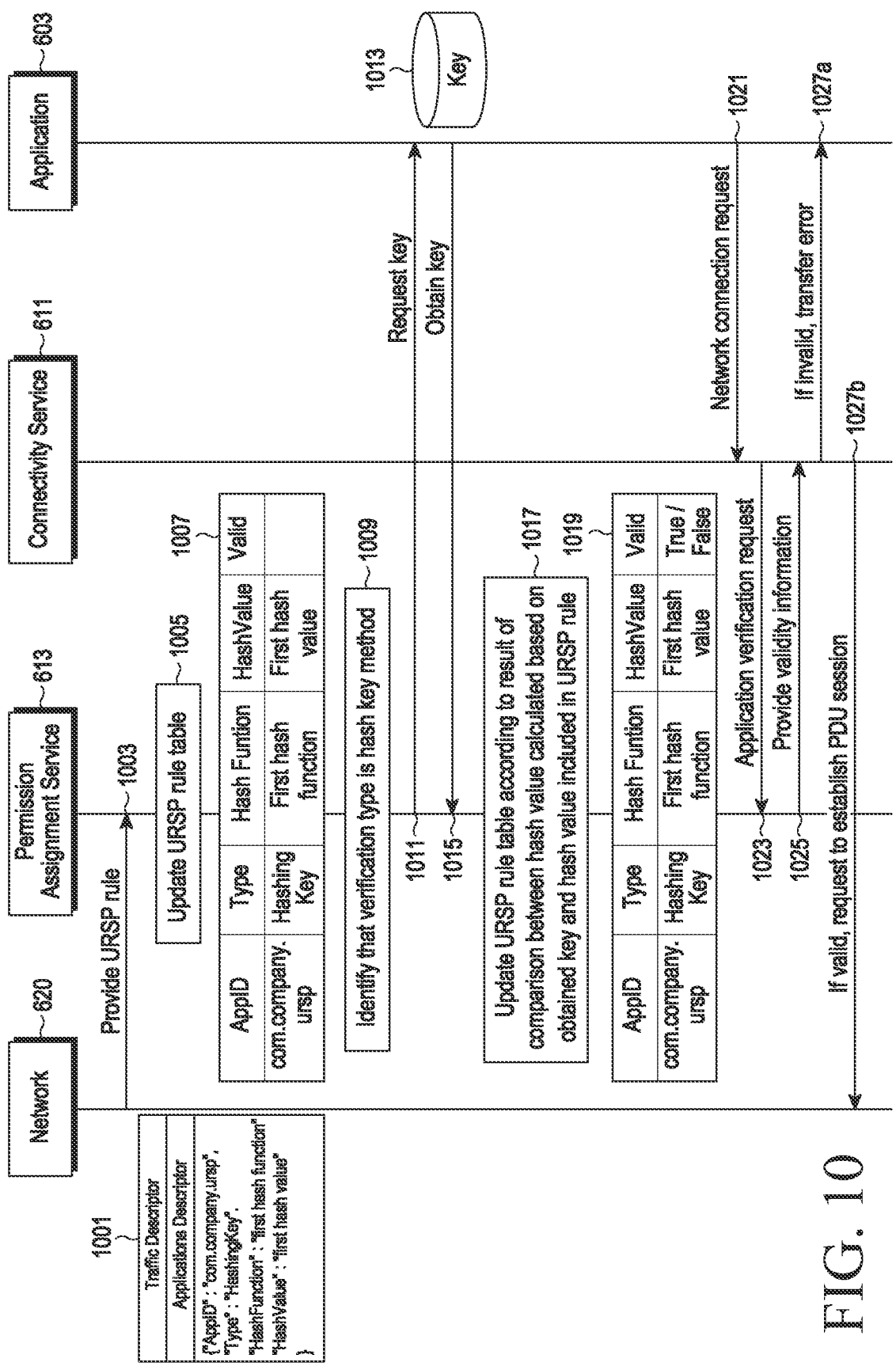
FIG. 10 is a flowchart illustrating a method for operating an electronic device according to various embodiments.

FIG. 10 is a flowchart illustrating a method for operating an electronic device according to various embodiments. As described with reference to FIG. 6, the operations of the ConnectivityService 611 and the PermissionAssignmentService 613 may be performed by the electronic device 101. It is assumed that the application 603 is stored and/or installed on the electronic device 101.

According to various embodiments, the network 620 may store the URSP rule 1001. For example, the URSP rule 1001 may be configured in a JSON format as shown in Table 5, but the expression format is not limited as described above. The network 620 may provide the URSP rule 1001 to the electronic device 101 in operation 1003, and for example, the PermissionAssignmentService 613 may receive and store the URSP rule 801. The PermissionAssignmentService 613 may update the URSP rule table 1007 in operation 1005. In one example, the URSP rule table 1007 managed by the electronic device 101 may include application identification information (e.g., a package name), a verification type, a hash function, a value for verification (e.g., a hash value), and whether it is valid. Before the validity corresponding to specific application identification information is verified, the validity field of the URSP rule table 807 may be emptied. In operation 1009, the PermissionAssignmentService 613 may identify that the verification type is the hash key method. The PermissionAssignmentService 613 may search for an application corresponding to the hash key method. In the example of FIG. 10, it is assumed that the application 603 is an application corresponding to the hash key method.

According to various embodiments, in operation 1011, the PermissionAssignmentService 613 may request a key from the application 603. In operation 1015, the PermissionAssignmentService 613 may obtain a key 1013 from the application 603. Operations 1011 and 1015 may be, e.g., reading the key 1013 at the storage location (e.g., the storage location of the certificate) of the application 603. The key 1013 used to generate the hash value in the hash key method is the only data associated with the application and may include, but is not limited to, at least one or a combination of a certificate or a certificate public key, a signing key, or installed application package data (or part thereof). In operation 1017, the PermissionAssignmentService 613 may update the URSP rule table 1019 according to a result of comparison between the hash value calculated based on the obtained key 1013 and the hash value included in the URSP rule 1001. Whether the updated URSP rule table 1019 is valid may include any one of true or false. For example, when the hash value according to the calculation result of the first hash function and the key 1013 obtained in operation 1015 is the same as the first hash value included in the URSP rule 1001, true may be included in whether the URSP rule table 1019 is valid. For example, when the hash value according to the calculation result of the key 1013 obtained in operation 1015 and the first hash function is not the same as the first hash value included in the URSP rule 1001, false may be included in whether the URSP rule table 1019 is valid.

According to various embodiments, in operation 1021, the ConnectivityService 611 may receive a network connection request from the application 603. In operation 1023, the ConnectivityService 611 may request the PermissionAssignmentService 613 to verify the application 603. In operation 1025, the PermissionAssignmentService 613 may provide validity information about the application 603 to the ConnectivityService 611. The PermissionAssignmentService 613 may provide validity information about the application 603 to the ConnectivityService 611 based on whether is valid corresponding to the application identification information in the URSP rule table 1019. If the ConnectivityService 611 obtains false validity information, error information may be transferred to the application 603 in operation 1027*a*. If the ConnectivityService 611 obtains true validity information, the ConnectivityService 611 may request the network 620 to establish a PDU session, e.g., through the TelephonyService 615, in operation 1027*b*.

Figure 11:
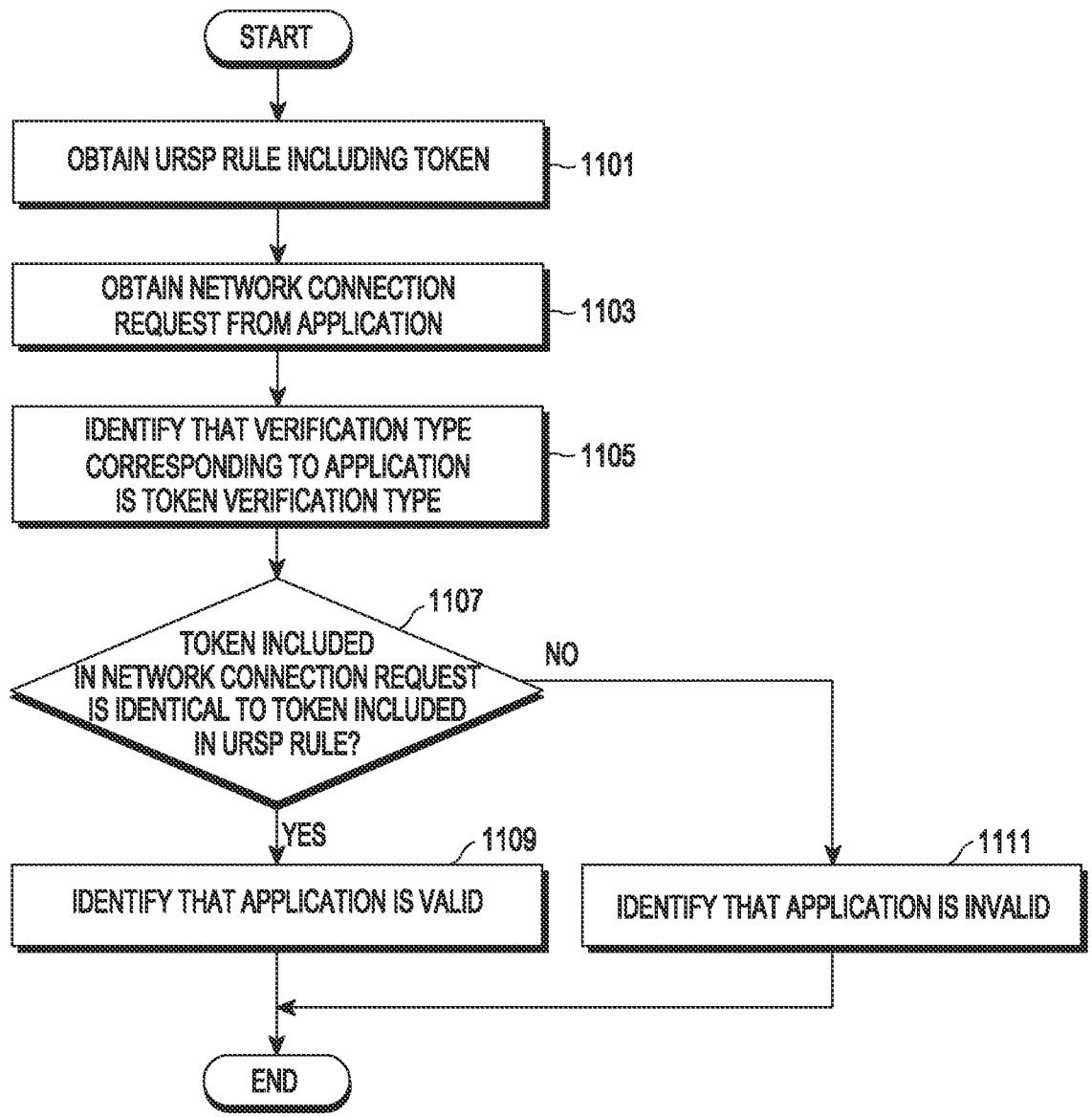
FIG. 11 is a flowchart illustrating a method for operating an electronic device according to various embodiments.

FIG. 11 is a flowchart illustrating a method for operating an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a token in operation 1101. For example, the application descriptor included in the URSP rule obtained by the electronic device 101 may be as shown in Table 6.

In Table 6, "com.company.ursp" which is the application identification information may be, e.g., the package name, "Token" which is the verification type may indicate the token method, and "pc3MiOiJ2ZWxvcGVydC5jb2OiLCJleHAiOiIxNDg1 MjcwMDAwMc2VybmFtZSI6 InZlbG9wZXJ0In" which is the verification value is the token value and may be implemented as a combination of characters and/or numbers. As the token, authorization code, client credential information, and/or authorization token may be used, but is not limited thereto. Although Table 6 includes information on one piece of application identification information, those skilled in the art will understand that the URSP rule may include one or more pieces of application identification information and information for verification corresponding to each thereof. Meanwhile, the application descriptor in the URSP rule of Table 6 may be implemented in, e.g., a JSON format, and in this case, may have an implementation form as shown in Table 7.

TABLE 7

{ "AppID" : "com.company.ursp",
"Type" : "Token",
"Token":"pc3MiOiJ2ZWxvcGVydC5jb2OiLCJleHAiOiIxNDg1 MjcwMDAwMc2VybmFtZSI6 InZlbG9wZXJ0In"
}

Meanwhile, the JSON format is merely exemplary, and there is no limitation on the method for expressing the URSP rule.

According to various embodiments, in operation 1103, the electronic device 101 may obtain a network connection request from the installed application. In operation 1105, the electronic device 101 may identify that the verification type corresponding to the application requesting network connection is the token verification method. For example, it is assumed that an application having a package name of "com.company.ursp" sends a request for network connection to the electronic device 101. The electronic device 101 may identify that the package name of the application requesting network connection is included in the application identification information about the URSP rule of Table 6. The electronic device 101 may identify that the verification type corresponding to the package name of "com.company.ursp" in the URSP rule of Table 6 is the token verification method.

According to various embodiments, in operation 1107, the electronic device 101 may determine whether the token included in the network connection request is the same as the token included in the URSP rule. If the application having the package name of "com.company.ursp" is a genuine application, the application may include the token of "pc3MiOiJ2ZWxvcGVydC5jb2OiLCJleHAiOiIxNDg1 MjcwMDAwMc2VybmFtZSI6 InZlbG9wZXJ0In" in the network connection request. If the application of the package name of "com.company.ursp" is a counterfeit applica-

TABLE 6

| OSId | | OSAppId | |
|---|---|---|---|
| Android | application identification information | verification type | verification value |
| | com.company.ursp | Token | pc3MiOiJ2ZWxvcGVydC5jb2OiLCJleHAiOiIxNDg1 MjcwMDAwMc2VybmFtZSI6 InZlbG9wZXJ0In | tion, the network connection request from the application may not include the token of "pc3MiOiJ2ZWxvcGVydC5jb20iLCJleHAiOiIxNDg1 MjcwMDAwMc2VybmFtZSI6 InZIbG9wZXJ0In". When the token included in the network connection request is the same as the token included in the URSP rule (yes in operation 1107), the electronic device 101 may identify that the application is valid in operation 1109. When the token included in the network connection request is not the same as the token included in the URSP rule (no in operation 1107), the electronic device 101 may identify that the application is invalid in operation 1111. If it is identified that the application requesting network connection is valid, the electronic device 101 may establish a PDU session for the application or may associate the application with the previously established PDU session. If it is identified that the application requesting network connection is invalid, the electronic device 101 may refrain from establishing a PDU session for the application. In this case, the electronic device 101 may refrain from network connection of the application, or may establish a PDU session not requiring authority and/or associate it to the PDU session.

Figure 12:
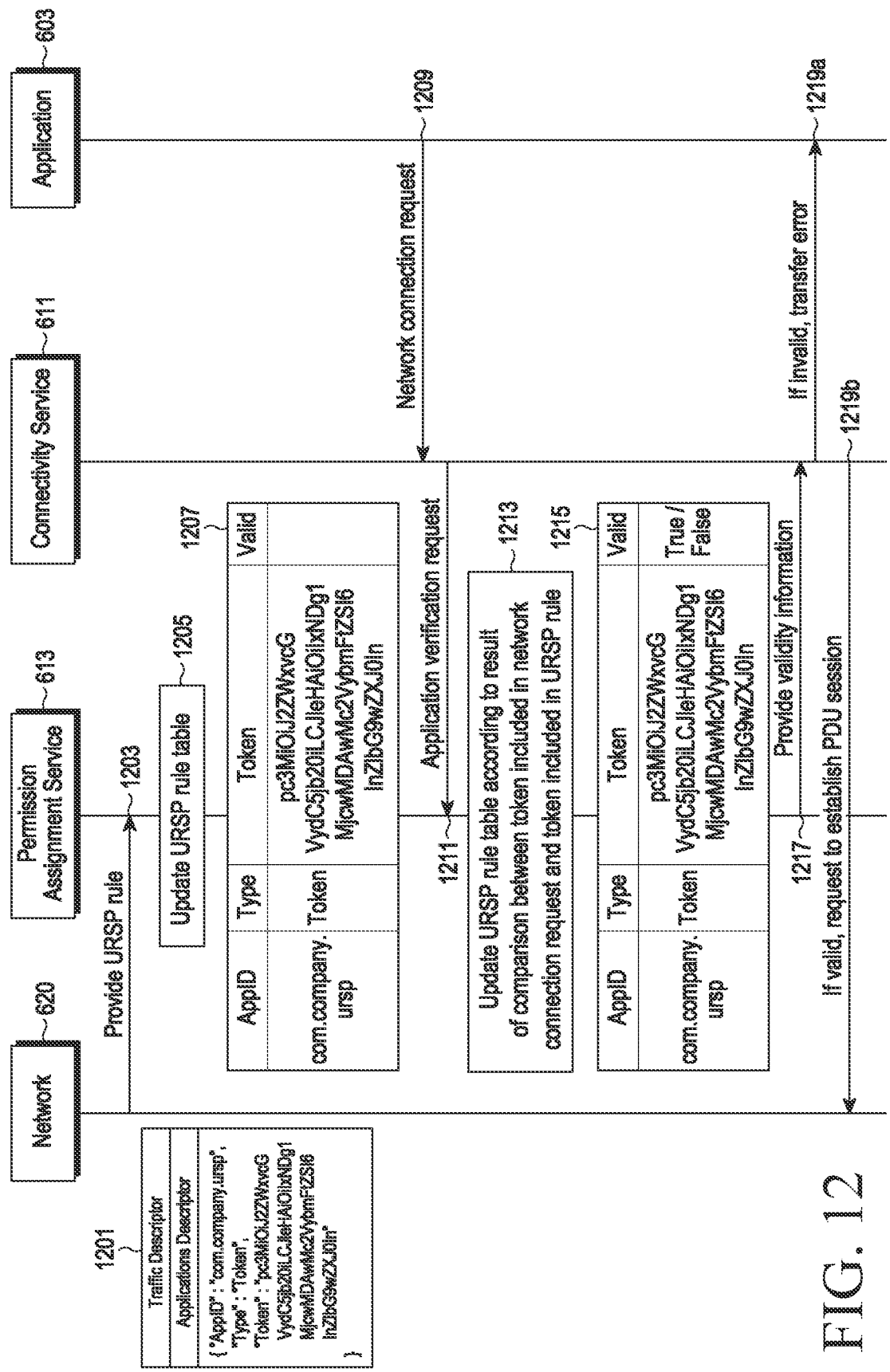
FIG. 12 is a flowchart illustrating an operation method of an electronic device according to various embodiments.

FIG. 12 is a flowchart illustrating an operation method of an electronic device according to various embodiments. As described with reference to FIG. 12, the operations of the ConnectivityService 611 and the PermissionAssignmentService 613 may be performed by the electronic device 101. It is assumed that the application 603 is stored and/or installed on the electronic device 101.

According to various embodiments, the network 620 may store the URSP rule 1201. For example, the URSP rule 1201 may be configured in a JSON format as shown in Table 7, but the expression format is not limited as described above. The network 620 may provide the URSP rule 1201 to the electronic device 101 in operation 1203, and for example, the PermissionAssignmentService 613 may receive and store the URSP rule 1201. The PermissionAssignmentService 613 may update the URSP rule table 1207 in operation 1205. In one example, the URSP rule table 1207 managed by the electronic device 101 may include application identification information (e.g., a package name), a verification type, a value for verification (for example, a token), and whether it is valid. Before the validity corresponding to specific application identification information is verified, the validity field of the URSP rule table 1207 may be emptied.

According to various embodiments, in operation 1209, the ConnectivityService 611 may receive a network connection request from the application 603. The network connection request may include a token of the application 603. In operation 1211, the ConnectivityService 611 may request the PermissionAssignmentService 613 to verify the application 603. In operation 1213, the PermissionAssignment-Service 613 may update the URSP rule table 1215 according to a comparison result between the token included in the network connection request and the token included in the URSP rule 1201. Whether the updated URSP rule table 1215 is valid may include any one of true or false. For example, when the token included in the network connection request and the token included in the URSP rule 1201 are the same, true may be included in whether the URSP rule table 1215 is valid. For example, when the token included in the network connection request and the token included in the URSP rule 1201 are not the same, false may be included in whether the URSP rule table 1215 is valid. In operation 1217, the PermissionAssignmentService 613 may provide validity information about the application 603 to the ConnectivityService 611. The PermissionAssignmentService 613 may provide validity information about the application 603 to the ConnectivityService 611 based on whether is valid corresponding to the application identification information in the URSP rule table 1215. If the ConnectivityService 611 obtains false validity information, error information may be transferred to the application 603 in operation 1219*a*. If the ConnectivityService 611 obtains true validity information, the ConnectivityService 611 may request the network 620 to establish a PDU session, e.g., through the TelephonyService 615, in operation 1219*b*.

Figure 13A:
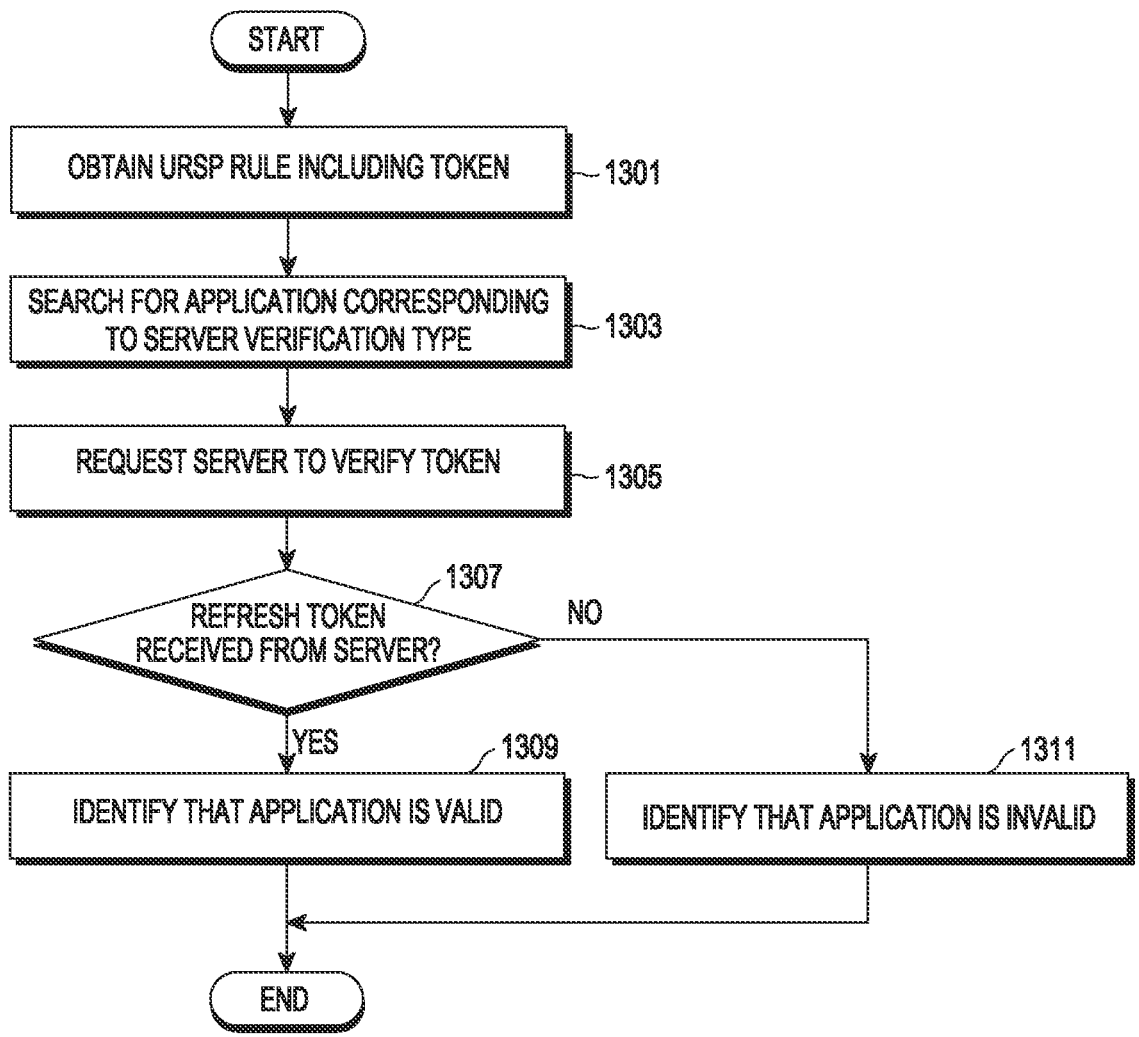
FIG. 13A is a flowchart illustrating an operation method of an electronic device according to various embodiments.

FIG. 13A is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a token in operation 1301. For example, the application descriptor included in the URSP rule obtained by the electronic device 101 may be as shown in Table 8.

TABLE 8

| OSId | OSAppId | | |
|---|---|---|---|
| Android | application identification information | verification type | verification value |
| | com.company.ursp | AuthorizationServer | pc3MiOiJ2ZWxvcGVydC5jb20iLCJleH AiOiIxNDg1MjcwMDAwMc2VybmFtZ SI6InZIbG9wZXJ0In |

In Table 8, "com.company.ursp" which is the application identification information may be, e.g., the package name, "AuthorizationServer" which is the verification type may indicate the verification server method, and "pc3MiOJ2ZWxvcGVydC5jb20iLCJleHAiOiIxNDg1 MjcwMDAwMc2VybmFtZSI6 InZlbG9wZXJ0In" which is the verification value is the token value and may be implemented as a combination of characters and/or numbers. As the token, Jason Web Token (JWT), Oauth Token, and/or UserID, UserSecret may be used, but the disclosure is not limited thereto. Although Table 8 includes information on one piece of application identification information, those skilled in the art will understand that the URSP rule may include one or more pieces of application identification information and information for verification corresponding to each thereof. Meanwhile, the application descriptor in the URSP rule of Table 8 may be implemented in, e.g., a JSON format, and in this case, may have an implementation form as shown in Table 9.

TABLE 9

{ "AppID" : "com.company.ursp",
"Type": " AuthorizationServer",
"Token":"pc3MiOiJ2ZWxvcGVydC5jb20iLCJleHAiOiIxNDg1 MjcwMDAwMc2VybmFtZSI6 InZlbG9wZXJ0In"
}

Meanwhile, the JSON format is merely exemplary, and there is no limitation on the method for expressing the URSP rule.

According to various embodiments, the electronic device 101 may search for an application corresponding to the server verification type in operation 1303. The electronic device 101 may search whether an application having application identification information (e.g., a package name of "com.company.ursp") having the verification type of AuthorizationServer in Table 9 is stored and/or installed on the electronic device 101. For example, it is assumed that an application having a package name of "com.company.ursp" is installed on the electronic device 101. In operation 1305, the electronic device 101 may request the verification server 630 to verify the token. For example, the electronic device 101 may parse the URI of the verification server 630 from the token. For example, the electronic device 101 may obtain the URI of the verification server 630 stored (or defined) in the storage in the electronic device 101. For example, the electronic device 101 may obtain the URI of the verification server 630 from the verification type value (e.g., AuthorizationServer:auth.company.com). The electronic device 101 may request the parsed URI to verify the token. The verification server 630 may perform verification based on the received token. When the verification is successful, the verification server 630 may provide a refresh token to the electronic device 101. In one example, the verification server 630 may request authentication information from the electronic device 101 based on reception of the token. The electronic device 101 may display a UI for requesting to input authentication information, and may obtain authentication information (e.g., ID, password, and/or biometric information) from the user. The electronic device 101 may transmit authentication information (or information obtained by processing authentication information) to the verification server 630. The verification server 630 may verify the token based on the received authentication information. Meanwhile, the above-described verification method is merely exemplary, and the verification method in the verification server 630 is not limited.

According to various embodiments, in operation 1307, the electronic device 101 may determine whether a refresh token is received from the verification server 630. When the refresh token is received from the verification server 630 (yes in operation 1307), the electronic device 101 may identify that the application corresponding to the server verification type is valid in operation 1309. When the refresh token is not received from the verification server 630 (no in operation 1307), the electronic device 101 may identify that the application corresponding to the server verification type is invalid in operation 1311. As described above, even before the network connection request is obtained from the application, the electronic device 101 may identify whether the application corresponding to the server verification type is valid based on the URSP rule being obtained. After it is identified whether it is valid, the electronic device 101 may obtain a network connection request from the application. If it is identified that the application is valid, the electronic device 101 may establish a PDU session for the application or may associate the application with the previously established PDU session. If it is identified that the application is invalid, the electronic device 101 may refrain from establishing a PDU session for the application. In this case, the electronic device 101 may refrain from network connection of the corresponding application, or may establish a PDU session not requiring authority and/or associate it to the PDU session.

Figure 13B:
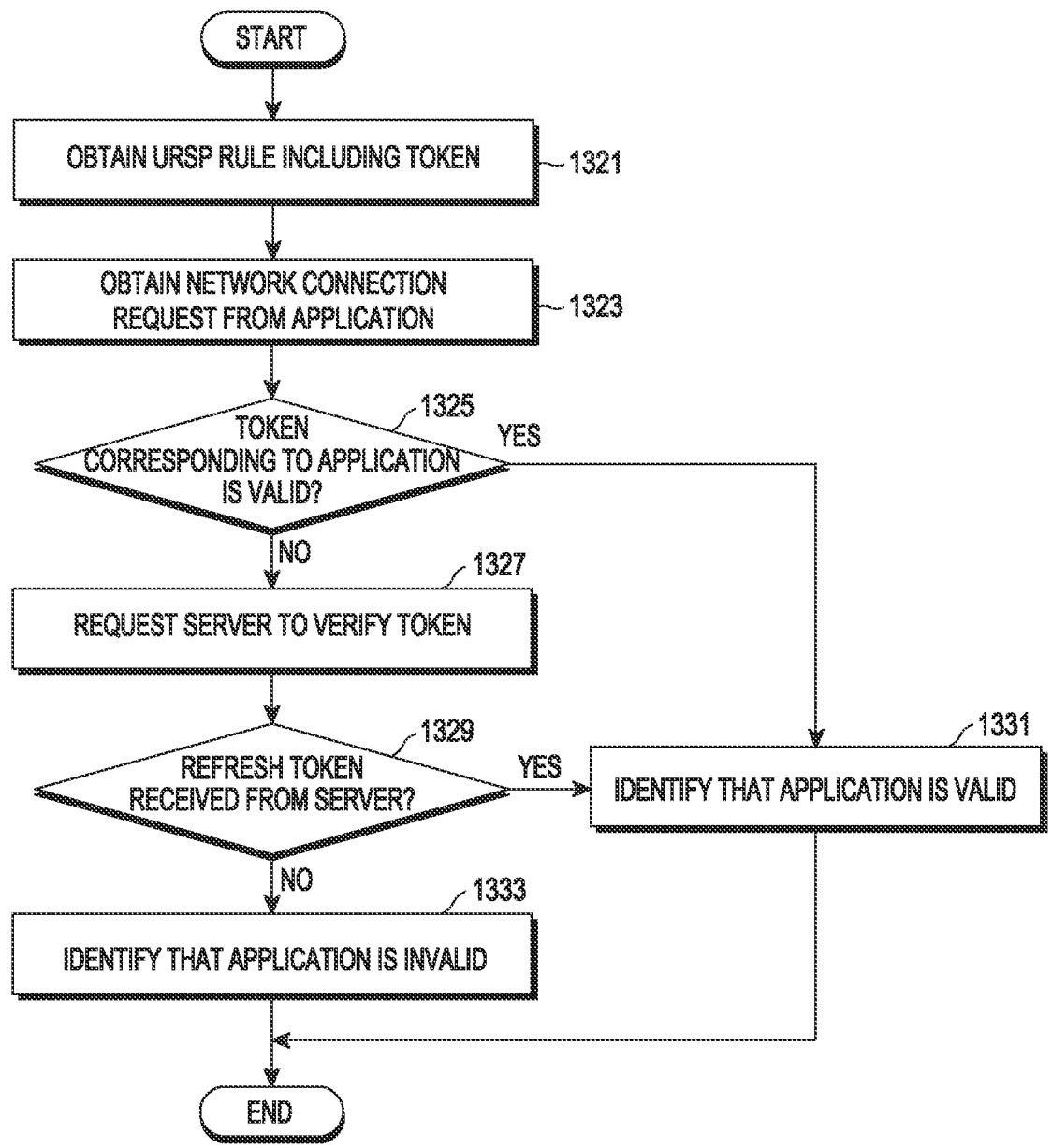
FIG. 13B is a flowchart illustrating an operation method of an electronic device according to various embodiments.

FIG. 13B is a flowchart illustrating an operation method of an electronic device according to various embodiments.

According to various embodiments, an electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 6) may obtain a URSP rule including a token in operation 1321. For example, the electronic device 101 may obtain a URSP rule as shown in Table 8. In operation 1323, the electronic device 101 may obtain a network connection request from the installed application. In operation 1325, the electronic device 101 may determine whether the token corresponding to the corresponding application (or the most recently received refresh token) is valid. The token (or refresh token) may have, e.g., an expiration date, and after the expiration date, it may be determined that the corresponding token (or refresh token) is no longer valid. If the token is invalid (no in operation 1325), the electronic device 101 may request the verification server 630 to verify the token in operation 1327. Thereafter, in operation 1329, the electronic device 101 may determine whether a refresh token is received from the verification server 630. When the refresh token is not received from the verification server 630 (no in operation 1329), the electronic device 101 may determine that the application of the server verification type is invalid in operation 1333. If the token is valid (yes in operation 1325) or if the refresh token is received from the verification server 630 (yes in operation 1329), the electronic device 101 may determine that the application of the server verification type is valid in operation 1331. If it is identified that the application requesting network connection is valid, the electronic device 101 may establish a PDU session for the application or may associate the new application with the previously established PDU session. If it is identified that the application requesting network connection is invalid, the electronic device 101 may refrain from establishing a PDU session for the application. In this case, the electronic device 101 may refrain from network connection of the application, or may establish a PDU session not requiring authority and/or associate it to the PDU session.

Figure 14A:
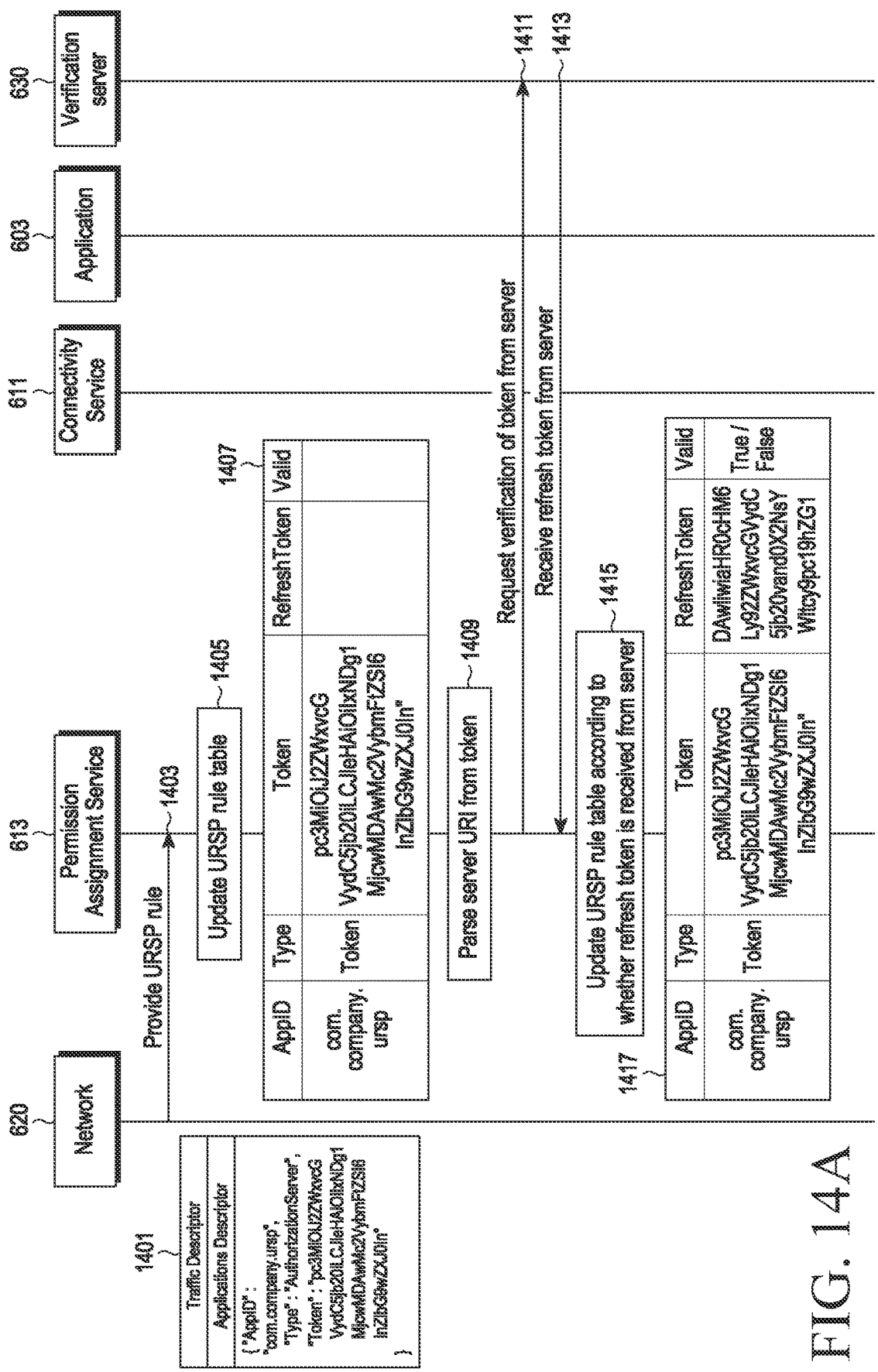
FIGS. 14A and 14B are flowcharts illustrating a method for operating an electronic device according to various embodiments.
Figure 14B:
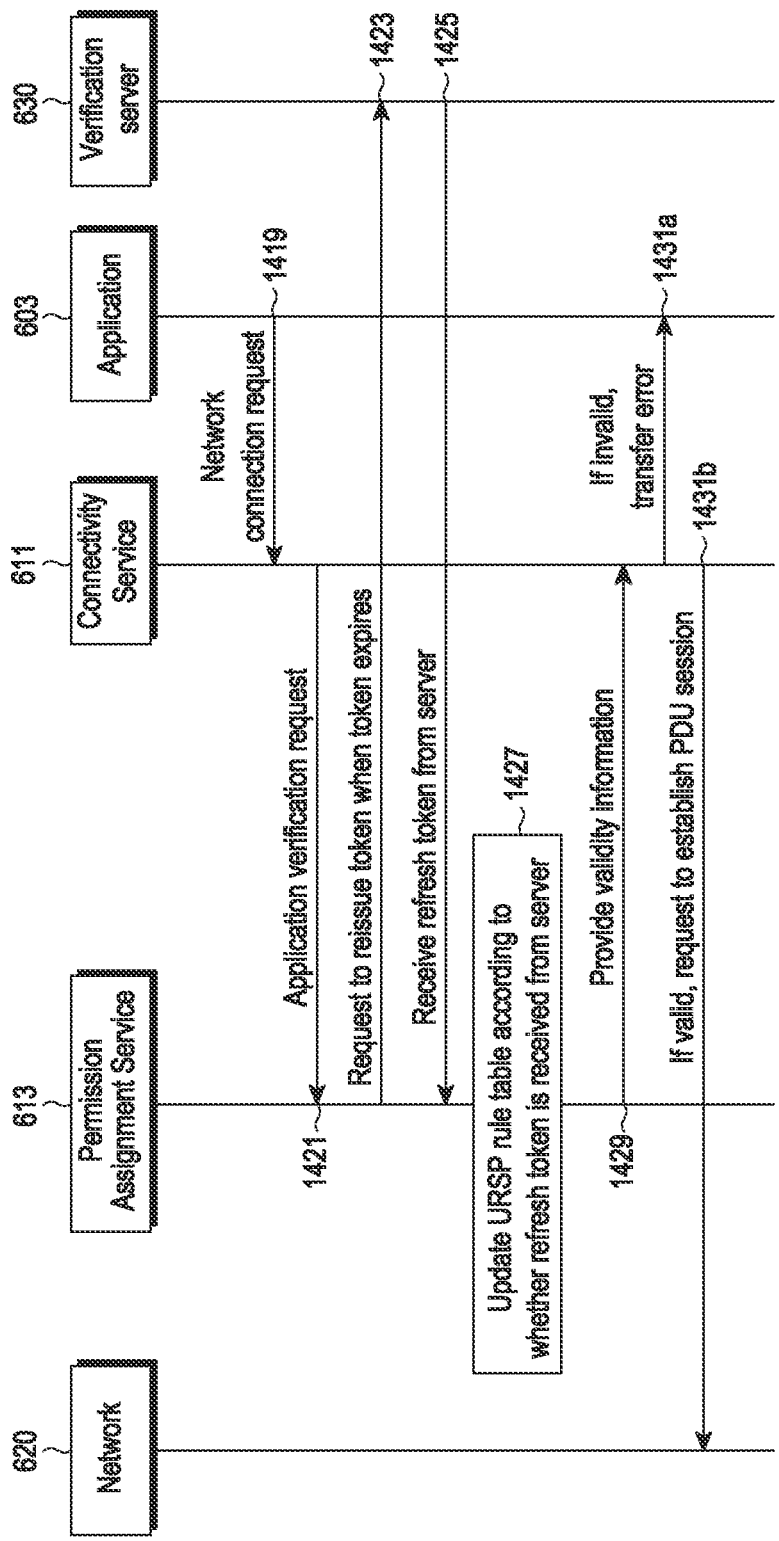

FIGS. 14A and 14B are flowcharts illustrating a method for operating an electronic device according to various embodiments. As described with reference to FIG. 6, the operations of the ConnectivityService 611 and the PermissionAssignmentService 613 may be performed by the electronic device 101. It is assumed that the application 603 is stored and/or installed on the electronic device 101.

According to various embodiments, the network 620 may store the URSP rule 1401. For example, the URSP rule 1401 may be configured in a JSON format as shown in Table 9, but the expression format is not limited as described above. The network 620 may provide the URSP rule 1401 to the electronic device 101 in operation 1403, and for example, the PermissionAssignmentService 613 may receive and store the URSP rule 1401. The PermissionAssignmentService 613 may update the URSP rule table 1407 in operation 1405. In one example, the URSP rule table 1407 managed by the electronic device 101 may include application identification information (e.g., a package name), a verification type, a value (e.g., token and/or refresh token) for verification, and whether it is valid. Before the validity corresponding to specific application identification information is verified, the validity field of the URSP rule table 1407 may be emptied.

According to an embodiment, the PermissionAssignmentService 613 may parse the server URI from the token based on the verification type being the server verification type in operation 1409. In operation 1411, the PermissionAssignmentService 613 may request the verification server 630 to verify the token. The verification server 630 may perform a verification operation. If the verification is successful, the verification server 630 may provide a refresh token. In operation 1413, the PermissionAssignmentService 613 may receive the refresh token from the verification server 630. If the verification fails, the PermissionAssignmentService 613 may not receive the refresh token. In operation 1415, the PermissionAssignmentService 613 may update the URSP rule table 1417 depending on whether the refresh token is received from the verification server 630. Whether the updated URSP rule table 1417 is valid may include any one of true or false. For example, when the refresh token is received, true may be included in whether the URSP rule table 1417 is valid, and the received refresh token value may be included. For example, when the refresh token is not received, false may be included in whether the URSP rule table 1417 is valid.

According to various embodiments, in operation 1419, the ConnectivityService 611 may receive a network connection request from the application 603. In operation 1421, the ConnectivityService 611 may request the PermissionAssignmentService 613 to verify the application 603. According to various embodiments, in operation 1419, the ConnectivityService 611 may receive a network connection request from the application 603. In the example of FIG. 14, it is assumed that the refresh token received in operation 1413 has expired. In operation 1423, when the token expires, the PermissionAssignmentService 613 may request the verification server 630 to reissue the token. The verification server 630 may perform a verification operation, and may provide a refresh token when the verification is successful. In operation 1425, the PermissionAssignmentService 613 may receive the refresh token from the verification server 630. If the verification fails, the PermissionAssignmentService 613 may not receive the refresh token. In operation 1427, the PermissionAssignmentService 613 may update again the URSP rule table 1417 depending on whether the refresh token is received from the verification server 630. Whether the updated URSP rule table 1417 is valid may include any one of true or false. Further, the refresh token value may also be updated. In operation 1429, the PermissionAssignmentService 613 may provide validity information about the application 603 to the ConnectivityService 611. The PermissionAssignmentService 613 may provide validity information about the application 603 to the ConnectivityService 611 based on whether is valid corresponding to the application identification information in the URSP rule table 819. If the ConnectivityService 611 obtains false validity information, error information may be transferred to the application 603 in operation 1431*a*. If the ConnectivityService 611 obtains true validity information, the ConnectivityService 611 may request the network 620 to establish a PDU session, e.g., through the TelephonyService 615, in operation 1431*b*.

According to various embodiments, an electronic device (e.g., the electronic device 101) may comprise a memory (e.g., the memory 130) and at least one processor (e.g., at least one of the processor 120, the first communication processor 212, the second communication processor 214, or the integrated communication processor 260). The at least one processor may be configured to store, in the memory, association information including identification information of at least one application, verification information for verifying each of the at least one application, and information for establishing a PDU session corresponding to the at least one application, identify a first value based on a first application having first identification information included in the association information, identify a second value based on verification information corresponding to the first identification information using the association information, establish a first PDU session using information for establishing the PDU session corresponding to the first application, based on the first value being identical to the second value, and transmit/receive data associated with the first application using the first PDU session.

According to various embodiments, the at least one processor may be configured to, as at least part of identifying the first value based on the first application having the first identification information included in the association information, identify that a verification type corresponding to the first identification information is a signing key method based on the association information and identify a first signing key corresponding to the first application as the first value, based on the verification type being the signing key method.

According to various embodiments, the at least one processor may be configured to, as at least part of identifying the second value based on the verification information corresponding to the first identification information using the association information, identify a second signing key included in the association information as the second value, and the at least one processor may be further configured to identify that the first application is valid when the first signing key is identical to the second signing key and to identify that the first application is invalid when the first signing key is not identical to the second signing key.

According to various embodiments, the at least one processor may be configured to, as at least part of identifying the first signing key corresponding to the first application as the first value, based on the verification type being the signing key method, identify the first signing key corresponding to the first application identified according to a result of searching for an application corresponding to the first identification information as the first value, based on obtaining the association information.

According to various embodiments, the at least one processor may be configured to, as at least part of identifying the first signing key corresponding to the first application as the first value, based on the verification type being the signing key method, install the first application on the electronic device and identify the first signing key corresponding to the first application as the first value, based on the installation of the first application.

According to various embodiments, the at least one processor may be configured to, as at least part of identifying the first signing key corresponding to the first application as the first value, based on the verification type being the signing key method, identify a network connection request from the first application and identify the first signing key corresponding to the first application as the first value, based on identifying the network connection request.

According to various embodiments, the at least one processor may be configured to, as at least part of identifying the first value based on the first application having the first identification information included in the association information, identify that a verification type corresponding to the first identification information is a hash key method based on the association information and identify a first hash value according to an operation result of a hash function included in the verification information of the association information and a key corresponding to the first application, as the first value, based on the verification type being the hash key method.

According to various embodiments, the at least one processor may be configured to, as at least part of identifying the second value based on the verification information corresponding to the first identification information using the association information, identify a second hash value included in the association information as the second value, and the at least one processor may be further configured to identify that the first application is valid when the first hash value is identical to the second hash value and to identify that the first application is invalid when the first hash value is not identical to the second hash value.

According to various embodiments, the at least one processor may be configured to, as at least part of identifying the first signing key corresponding to the first application as the first value, based on the verification type being the signing key method, identify the first hash value corresponding to the first application identified according to a result of searching for an application corresponding to the first identification information as the first value, based on obtaining the association information.

According to various embodiments, the at least one processor may be configured to, as at least part of identifying the first hash value according to the operation result of the hash function included in the verification information of the association information and the key corresponding to the first application, as the first value, based on the verification type being the hash key method, install the first application on the electronic device and identify the first hash value corresponding to the first application as the first value, based on the installation of the first application.

According to various embodiments, the at least one processor may be configured to, as at least part of identifying the first hash value according to the operation result of the hash function included in the verification information of the association information and the key corresponding to the first application, as the first value, based on the verification type being the hash key method, identify a network connection request from the first application and identify the first hash value corresponding to the first application as the first value, based on identifying the network connection request.

According to various embodiments, the at least one processor may be configured to, as at least part of identifying the first value based on the first application having the first identification information included in the association information, identify that a verification type corresponding to the first identification information is a token method based on the association information and identify a first token included in a network connection request from the first application as the first value, based on the verification type being the token method.

According to various embodiments, the at least one processor may be configured to, as at least part of identifying the second value based on the verification information corresponding to the first identification information using the association information, identify a second token included in the association information as the second value, and the at least one processor may be further configured to identify that the first application is valid when the first token is identical to the second token and to identify that the first application is invalid when the first token is not identical to the second token.

According to various embodiments, a method for operating an electronic device may comprise storing, in a memory of the electronic device, association information including identification information of at least one application, verification information for verifying each of the at least one application, and information for establishing a PDU session corresponding to the at least one application, identifying a first value based on a first application having first identification information included in the association information, identifying a second value based on verification information corresponding to the first identification information using the association information, establishing a first PDU session using information for establishing the PDU session corresponding to the first application, based on the first value being identical to the second value, and transmitting/receiving data associated with the first application using the first PDU session.

According to various embodiments, identifying the first value based on the first application having the first identification information included in the association information may include identifying that a verification type corresponding to the first identification information is a signing key method based on the association information and identifying a first signing key corresponding to the first application as the first value, based on the verification type being the signing key method.

According to various embodiments, identifying the second value based on the verification information corresponding to the first identification information using the association information may include identifying a second signing key included in the association information as the second value, and the method may further comprise identifying that the first application is valid when the first signing key is identical to the second signing key and to identify that the first application is invalid when the first signing key is not identical to the second signing key.

According to various embodiments, identifying the first value based on the first application having the first identification information included in the association information may include identifying that a verification type corresponding to the first identification information is a hash key method based on the association information and identifying a first hash value according to an operation result of a hash function included in the verification information of the association information and a key corresponding to the first application, as the first value, based on the verification type being the hash key method.

According to various embodiments, identifying the second value based on the verification information corresponding to the first identification information using the association information may include identifying a second hash value included in the association information as the second value, and the method may further comprise identifying that the first application is valid when the first hash value is identical to the second hash value and to identify that the first application is invalid when the first hash value is not identical to the second hash value.

According to various embodiments, identifying the first value based on the first application having the first identification information included in the association information may include identifying that a verification type corresponding to the first identification information is a token method based on the association information and identifying a first token included in a network connection request from the first application as the first value, based on the verification type being the token method.

According to various embodiments, identifying the second value based on the verification information corresponding to the first identification information using the association information may include identifying a second token included in the association information as the second value, and the method may further comprise identifying that the first application is valid when the first token is identical to the second token and to identify that the first application is invalid when the first token is not identical to the second token.

According to various embodiments, an electronic device may comprise a memory and at least one processor. The at least one processor may be configured to store, in the memory, association information including identification information of at least one application, verification information for verifying each of the at least one application, and information for establishing a PDU session corresponding to the at least one application, request a server to verify a token included in the verification information based on a verification type of the verification information included in the association information being a server verification method, receive a refresh token from the server, corresponding to the request, establish a first PDU session using information for establishing the PDU session corresponding to identification information of a first application in response to a network connection request from the first application corresponding to the server verification method based on the reception of the refresh token, and transmit/receive data associated with the first application using the first PDU session.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A. B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with." "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part." or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a memory, and
at least one processor, wherein the at least one processor is configured to:
store, in the memory, a user equipment route selection policy, URSP, rule comprising, for each of at least one application, an application identifier of the application, a verification type for the application, a verification value corresponding to the verification type for verifying the application, and information for establishing a protocol data unit, PDU, session corresponding to the application;
identify a first application identifier of a first application requesting a network connection;
identify, from the URSP rule, a verification type of the first application as a first verification type, the first verification type corresponding to the first application identifier in the URSP rule;
based on identifying that the verification type of the first application is the first verification type, request a first verification value corresponding to the first verification type from the first application;
obtain the first verification value from the first application, wherein the first application provides the first verification value in response to the request;
comparing the first verification value obtained from the first application to a second verification value set in the URSP rule corresponding to the first application identifier;
based on the first verification value being identical to the second verification value included in the URSP rule corresponding to the first application identifier, identify that the first application is valid;
based on the first application being identified as valid, establish a first PDU session using information for establishing a PDU session corresponding to the first application in the URSP rule; and
transmit or receive data associated with the first application using the first PDU session.

2. The electronic device of claim 1, wherein the at least one processor is further configured to:
identify that the first verification type corresponding to the first application identifier is a signing key method based on the URSP rule;
request a first signing key corresponding to the first application as the first verification value, based on the first verification type being the signing key method;
obtain the first signing key from the first application; and
based on the first signing key of the first application being identical to a second signing key of the URSP rule corresponding to the first application identifier, identify that the first application is valid.

3. The electronic device of claim 2, wherein the at least one processor is further configured to:
identify a second signing key included in the URSP rule as the second verification value, and identify that the first application is valid when the first signing key is identical to the second signing key and to identify that the first application is invalid when the first signing key is not identical to the second signing key.

4. The electronic device of claim 2, wherein the at least one processor is further configured to:
based on the first verification type being the signing key method, request the first signing key of the first application which is identified according to a result of searching for an application corresponding to the first application identifier as the first verification value, based on obtaining the URSP rule.

5. The electronic device of claim 2, wherein the at least one processor is further configured to:
install the first application on the electronic device; and
request the first signing key corresponding to the first application as the first verification value, based on the installation of the first application.

6. The electronic device of claim 2, wherein the at least one processor is further configured to:
identify a network connection request from the first application; and
request the first signing key corresponding to the first application as the first verification value, based on identifying the network connection request.

7. The electronic device of claim 1, wherein the at least one processor is further configured to:
identify that the first verification type corresponding to the first application identifier is a hash key method based on the URSP rule; and
identify a first hash value according to an operation result of a hash function included in verification information of the URSP and a key corresponding to the first application, as the first verification value, based on the first verification type being the hash key method.

8. The electronic device of claim 7, wherein the at least one processor is further configured to:
identify a second hash value included in the URSP rule as the second verification value, and identify that the first application is valid when the first hash value is identical to the second hash value and to identify that the first application is invalid when the first hash value is not identical to the second hash value.

9. The electronic device of claim 7, wherein the at least one processor is further configured to:
identify the first hash value corresponding to the first application identified according to a result of searching for an application corresponding to the first application identifier as the first verification value, based on obtaining the URSP rule.

10. The electronic device of claim 7, wherein the at least one processor is further configured to:
- install the first application on the electronic device; and
- identify the first hash value corresponding to the first application as the first verification value, based on the installation of the first application.

11. The electronic device of claim 7, wherein the at least one processor is further configured to:
- identify a network connection request from the first application; and
- identify the first hash value corresponding to the first application as the first verification value, based on identifying the network connection request.

12. The electronic device of claim 1, wherein the at least one processor is further configured to:
- identify that the first verification type corresponding to the first application identifier is a token method based on the URSP rule; and
- identify a first token included in a network connection request from the first application as the first verification value, based on the verification type being the token method.

13. The electronic device of claim 12, wherein the at least one processor is further configured to:
- identify a second token included in the URSP rule as the second verification value, and
- identify that the first application is valid when the first token is identical to the second token and to identify that the first application is invalid when the first token is not identical to the second token.

14. A method for operating an electronic device, the method comprising:
- storing, in a memory of the electronic device, URSP rule comprising, for each of at least one application, an application identifier of the application, a verification type for the application, a verification value corresponding to the verification type for verifying the application, and information for establishing a protocol data unit, PDU, session corresponding to the application;
- identifying a first application identifier of a first application requesting a network connection;
- identifying, from the URSP rule, a verification type of the first application as a first verification type, the first verification type corresponding to the first application identifier in the URSP rule;
- based on identifying that the verification type of the first application is the first verification type, requesting a first verification value corresponding to the first verification type from the first application;
- obtaining the first verification value from the first application, wherein the first application provides the first verification value in response to the request;
- comparing the first verification value obtained from the first application to a second verification value set in the URSP rule corresponding to the first application identifier;
- based on the first verification value being identical to the second verification value included in the URSP rule corresponding to the first application identifier, identifying that the first application is valid;
- based on the first application being identified as valid, establishing a first PDU session using information for establishing a PDU session corresponding to the first application in the URSP rule; and
- transmitting or receiving data associated with the first application using the first PDU session.

15. The method of claim 14, further comprising:
- identifying that the first verification type corresponding to the first application identifier is a signing key method based on the URSP rule; and
- identifying a first signing key corresponding to the first application as the first verification value, based on the first verification type being the signing key method.

16. The method of claim 15, further comprising:
- identifying a second signing key included in the URSP rule as the second verification value,
- identifying that the first application is valid when the first signing key is identical to the second signing key or identifying that the first application is invalid when the first signing key is not identical to the second signing key.

17. The method of claim 15, further comprising:
- identifying the first signing key corresponding to the first application identified according to a result of searching for an application corresponding to the first application information as the first verification value, based on obtaining the URSP rule.

18. The method of claim 15, further comprising:
- installing the first application on the electronic device; and
- identifying the first signing key corresponding to the first application as the first signing key, based on the installation of the first application.

19. The method of claim 15, further comprising:
- identifying a network connection request from the first application; and
- identifying the first signing key corresponding to the first application as the first signing key, based on identifying the network connection request.

20. The method of claim 14, further comprising:
- identifying that the first verification type corresponding to the first application identifier is a hash key method based on the URSP rule; and identifying a first hash value according to an operation result of a hash function included in verification information of the URSP rule and a key corresponding to the first application, as the first verification value, based on the first verification type being the hash key method.

* * * * *